United States Patent
Hammock et al.

(10) Patent No.: US 6,793,062 B2
(45) Date of Patent: Sep. 21, 2004

(54) RESERVOIR FOR ROD-LIKE ARTICLES

(75) Inventors: Mike Hammock, Milton Keynes (GB); Anthony R Brown, Milton Keynes (GB); Alan K Richardson, Milton Keynes (GB); Walter Carascon, Milton Keynes (GB); Gary T Walford, Milton Keynes (GB)

(73) Assignee: Molins Plc, Milton Keynes (GB)

( * ) Notice: Subject to any disclaimer, the term of this patent is extended or adjusted under 35 U.S.C. 154(b) by 0 days.

(21) Appl. No.: 10/385,723

(22) Filed: Mar. 12, 2003

(65) Prior Publication Data

US 2003/0173185 A1 Sep. 18, 2003

(30) Foreign Application Priority Data

Mar. 12, 2002 (GB) ............................................. 0205758

(51) Int. Cl.[7] ................................................. B65G 1/00
(52) U.S. Cl. ................................. 198/347.1; 198/347.3
(58) Field of Search .......................... 198/347.1, 347.3, 198/588, 812

(56) References Cited

U.S. PATENT DOCUMENTS 6,065,585 A * 5/2000 Bryant et al. ............ 198/347.1
6,206,169 B1 * 3/2001 Spatafora ................. 198/347.1

FOREIGN PATENT DOCUMENTS

WO 9944446 9/1999

* cited by examiner

Primary Examiner—James R. Bidwell
(74) Attorney, Agent, or Firm—Antonelli, Terry, Stout & Kraus, LLP

(57) ABSTRACT

There is provided a variable capacity reservoir (10) for rod-like articles comprising a product input station (24) and a product output station (26) having a continuous endless conveyor (12) extending therebetween with an adjustable product conveying length (14) extending between the product input and output stations and complimentary adjustable conveyor take up length (16) between the output and input stations, wherein the product conveying length (14) extends in a spiral arrangement between a first drum member (18) and a second drum member (20) and a conveyor take up length (16) extends between said second drum member (20) and a third drum member (22), wherein the second drum member (20) is adjustable between the two fixed outer drums (18, 22) to adjust the lengths of the product conveying length (14) and conveyor take up length (16) in a complimentary manner.

22 Claims, 14 Drawing Sheets

Figure 1:
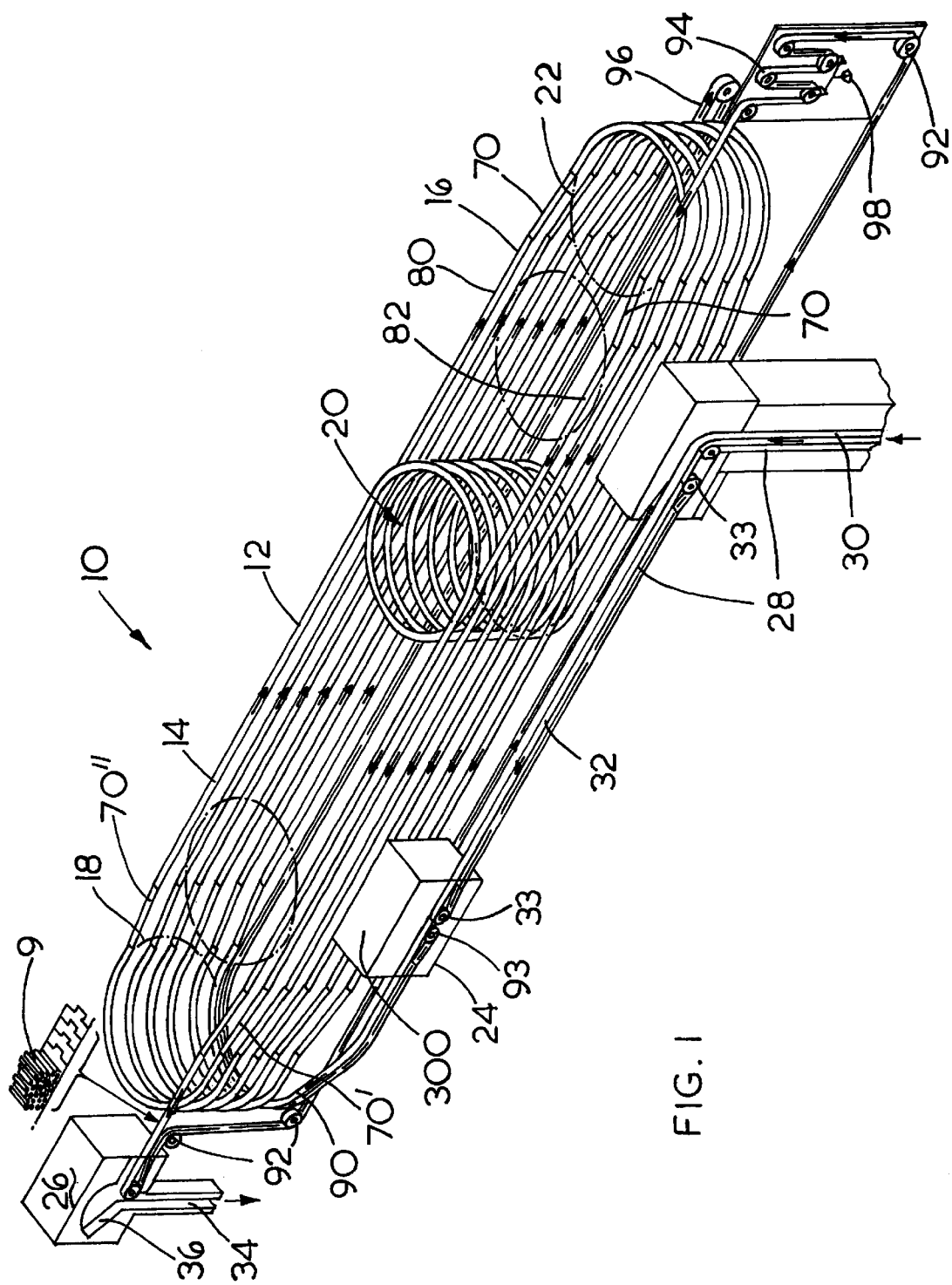

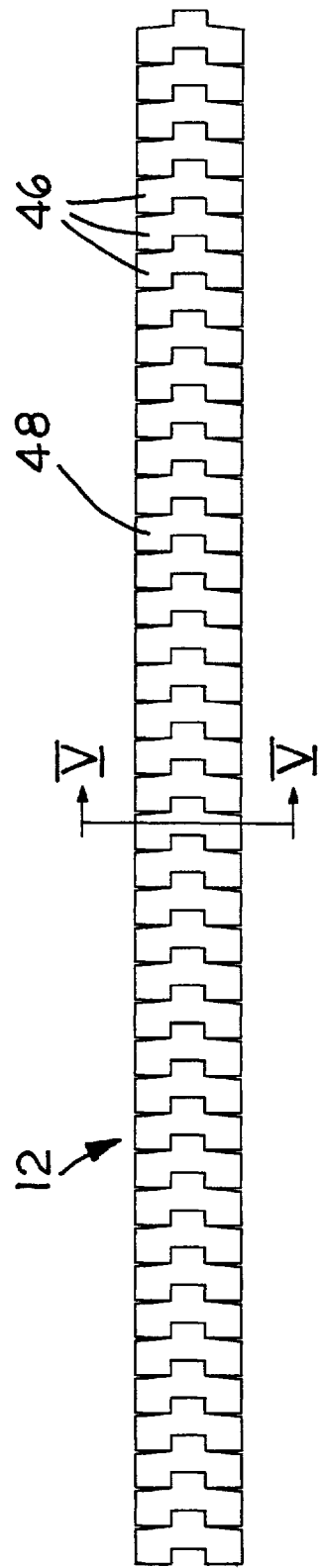
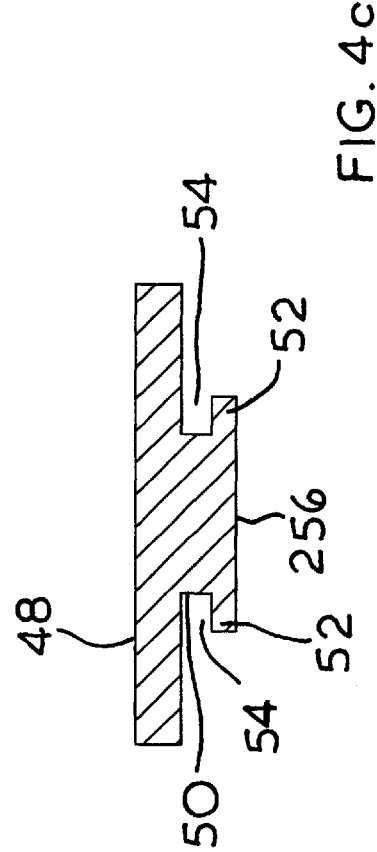

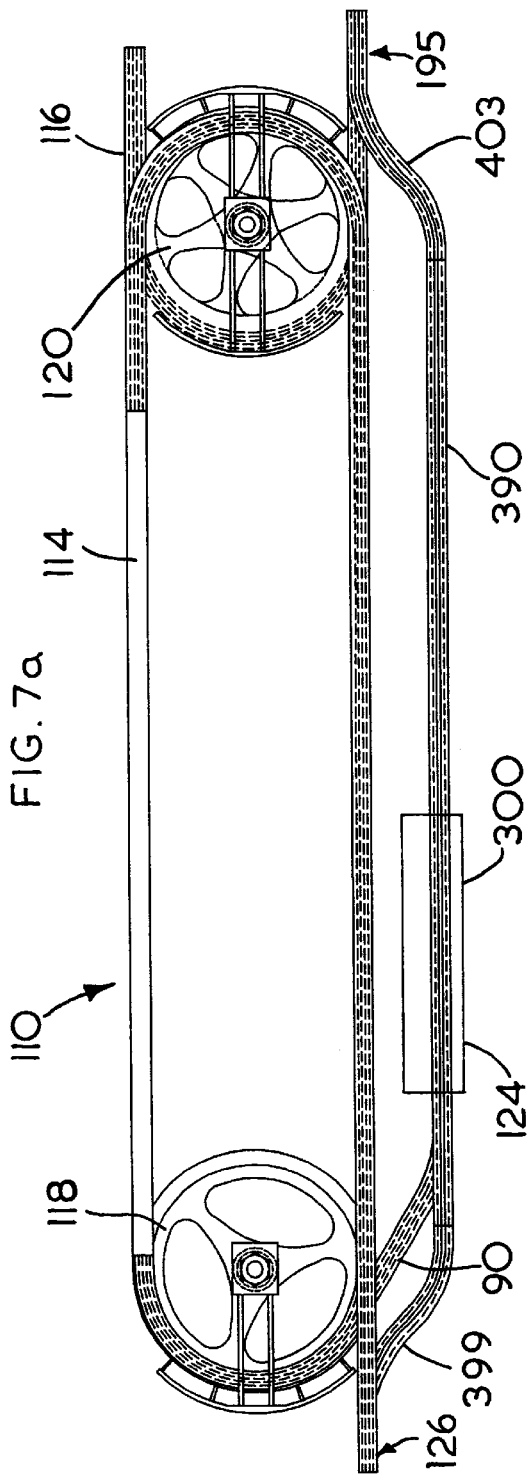
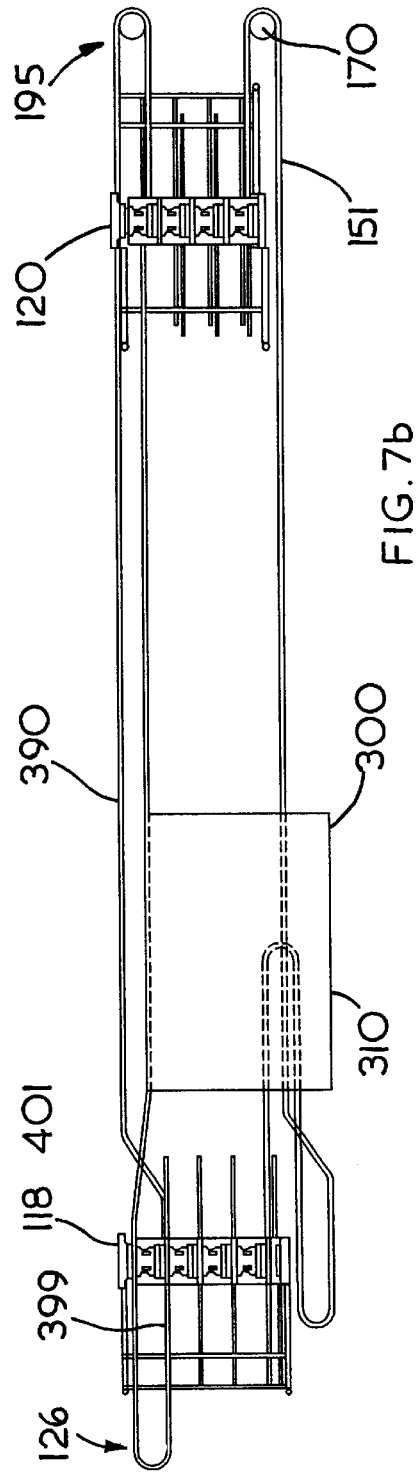

RESERVOIR FOR ROD-LIKE ARTICLES

The current invention relates to reservoirs for rod-like articles, particularly articles of the tobacco industry such as cigarettes or filter rods.

In the manufacture of articles of the tobacco industry it is common practice to transport the articles directly from the manufacturing equipment where such articles are made to a receiving device such as a packing machine in the case of cigarettes. The articles themselves are usually conveyed in the form of a continuous multi-layer stream of articles or "carpet" moving in a direction transverse to the lengths of the articles themselves.

In common practice the depth of such carpets are 50–100 mm in height.

In addition, due to the complex nature of both the manufacturing and packaging machines used in the tobacco industry, and the high volumes of product produced and packaged per machine, it is found that if one of these machines is forced to shut down as a result of a process failure, a considerable volume of product is often left in the machine which, due to the nature of these products, often means that such left product has to be simply disposed of once the machine is restarted. Similarly, since the machines operate concurrently so as to maintain operation of both machines, it is found that if a problem is incurred in one machine such as the packaging machine, then the conveyor system between the manufacturing machine and the packaging machine will often back-up very quickly necessitating a shut-down of the corresponding machine of the pair. Thus, the problem is duplicated whereby excess product held in both machines while they are shutdown necessitates the disposal of twice as much product. For this reason, it is highly desirable that a buffer reservoir be provided to compensate for any difference in the number of products produced and the number to be packed.

There are two primary types of buffer reservoir used for this purpose, the first of which is referred to as a FIFO reservoir (first in first out) whereby such reservoirs comprise a conveyor belt for receiving product and transporting such product around a stacked loop, often in the form of a spiral, between an input station and an output station, whereby the output station is remote from the input station, such that the conveyor belt only travels in one direction so that the first product to be received in such a buffer reservoir is also the first product out, irrespective of whether or not the reservoir is maintained in continuous operation. It is common practice for such FIFO reservoirs to be of adjustable length whereby the dimensions between parallel supports of such spiralled belts are adjustable to and away from one another thereby increasing or decreasing the belt length as required to adjust capacity. In this manner if the packaging machine were to become inoperative, then by adjusting the distance between the supports of the spiral of such a FIFO reservoir, the belt length is increased and by appropriate variation of the input and output speed of the belt (the input speed may in fact be maintained constant while the output speed could be completely stopped) the excess product being fed into the reservoir is accommodated by the increase in length of the belt around the various spirals even if no product is output. Usually belts of this type are those of the type referred to as continuous endless belts which have an associated adjustment means accommodating part of the belt not carrying product, whereby a corresponding adjustment of this non product carrying length will either provide additional belt for lengthening the spiral or will accommodate belt length as the spiral is reduced in length. Example of this type of FIFO equipment is seen in European Patent No. 0738478 and WO 99/44446.

Alternatively, a second type of buffer reservoir is referred to as a FILO reservoir (first in last out). Here it is common place for the flow path of the carpet from the manufacturing machine to conventionally flow along one branch of a T-junction and to be transmitted down the main trunk of such T-junction to the packaging machine. In the event that the packaging machine is unable to cope with the volume of product from the manufacturing machine, the T junction serves to divert the product via the second branch to an input station of a, usually, spiral endless conveyor which transports the product away from this input station during the storage buffer period. Subsequently, when additional storage is no longer required, the displacement of the belt in the spiral buffer is stopped and product from the manufactured equipment is then diverted back directly to the packaging machinery. In this respect, a carpet of product is now maintained in the buffer reservoir and should there be a disruption to the manufacturing process the conveyor of the buffer reservoir can be reversed so as to transport such stored product in a reverse direction along the spiral conveyor back towards the input station so that it can be transferred to the T-junction and thus to the packaging machine. In this respect it will be appreciated that the first product to enter such a buffer reservoir will also be the last product out. An example of a FILO buffer reservoir of this type is shown in U.S. Pat. No. 5,361,888.

However, both of these standard types of reservoir equipment have been found to have certain drawbacks, whereby when the FILO equipment is used it is possible that product entered into this storage buffer could be maintained therein for a considerable period of time to the detriment of the product itself. It is necessary that the product itself is not maintained in a buffer for too long a period of time else it could suffer due to moisture in the air or otherwise become stale. As such, FILO equipment often requires periodical emptying to ensure the product does not suffer in this way and this in itself requires careful monitoring of the products stored in these buffers.

Conversely, FIFO equipment whilst avoiding the above mentioned problems of FILO equipment, necessitate both a product transportation branch and a conveyor return branch of the conveyor (the product transportation branch existing between product input station and a product output station, with the conveyor return branch extending from the product output station to the product input station) often necessitating a large volume of belt to be maintained in the conveyor return branch in order to compensate appropriate and necessary adjustment of the product conveying length of the belt. In particular, the prior art referred to above has achieved this in a rather complex manner by producing two separate belt sections such that the reservoir occupies a large area. Therefore an object of the present invention is to provide for an improved adjustable buffer reservoir which alleviates the aforementioned problems.

According to the present invention there is provided a variable capacity reservoir system for rod like articles, comprising a product input station and a product output station and having a continuous endless conveyor with an adjustable product conveying length and a complimentary adjustable conveyor take up length; it also has a conveyor adjustment means for effecting an increase or decrease of the product conveying length and complimentary decrease or increase respectively in the conveyor take up length wherein the conveyor adjustment means comprises first and second support members between which and supported by is one of the product conveying length or conveyor take up length so as to define a spiral path extending around the first and second support means; characterised in that the other of the product conveyor length or conveyor take up length is supported between the second support member and a third support member wherein the first and third support members are restrained from relative displacement towards said second support member and which second support member is displaceable relative to both the first and third support means to simultaneously effect the complimentary adjustment of the conveyor length extending between the first and second support means and the second and third support means respectively.

Preferably, at least one of the first and third support members will be secured from displacement relative to the second support member and, in one embodiment, both first and third support members are so secured from displacement. Alternatively, at least one of the first and third support members may be restrained from displacement towards the second support member by the application of a biasing force thereto in a direction away from the second support member so as to bias the at least one of the first and second support members away from the second support member. In this manner, at least one of the first and third support members will form a conveyor slack elimination device which, under the biasing force applied thereto will take up any slack in the conveyor. It is preferable that one of the first and third support members will be secured from displacement whilst the other will enjoy a biasing force to form such a conveyor slack elimination device.

Whilst it is possible for the second support member to lie offset from a plane extending between the first and third members, it is preferable that this second support member is disposed directly between the first and third support members.

It is usual that at least the first and second support members will further comprise a support means for effecting support and transmission of the spiral conveyor around the first and second support means. The support means usually define an arcuate path and preferably take the form of wheels disposed about a substantially upright or vertical axis.

The support members themselves usually comprise a cylindrical drum so that each arcuate path is disposed in a plane perpendicular to the axis of this drum, so as to preferably lie in a horizontal plane. Preferably, this reservoir system will further comprise guide means associated with at least one of an input or output of the arcuate path so as to effect displacement of the endless conveyor from a first plane to a second plane.

In a preferred form of the current invention, both the product conveying length and the conveyor take up length both extend around the second support member so as to be interleaved. This is particularly the case in the situation of a cylindrical drum.

Preferably, the first and second support members comprise parallel axis about which the spiral path extends.

In addition, it is usual that the other of the product conveying length or the conveyor take up length further defines a complimentary second spiral path around and between the second and third support members, often having the same pitch as that of the first spiral path. Whilst the pitch of both or each spiral paths may be variable around the drum, it is preferable that the spiral path pitch is constant for both spirals and often constant between each spiral path of the interleaved paths.

Alternatively, the other of the product conveying length or the conveyor take up length may define at least one pair of first and second adjacent path lengths extending between the second and third support members in opposite directions in a first plane parallel to the axis of the second support member, wherein the third support member comprises transmission means for transmitting said conveyor between said adjacent first and second path lengths in this first plane. At least one third path length may be associated with this pair of first and second path lengths, again extending between the second and third support members adjacent to and in an opposite direction to one of the first and second path lengths so as to lie in a second plane therewith, perpendicular to the axis of the second support member, wherein the second support member comprises transmission means, usually arcuate, for transmitting the conveyor between the third and one of the first and second path lengths in this second plane.

Preferably, the third support member transmission means may be independently restrained from displacement towards the second support member by the application of a biasing force thereto in a direction away from the second support member so as to bias this third support member transmission means away from the second support member. In this manner, even where the third support member is secured from displacement relative to the second support member, the transmission means on the third support member may be independently biased in this manner so as to effect a conveyor slack elimination device.

In one or more embodiments of the invention, the other of the product conveying length or conveyor take up length will define at least one serpentine path.

Preferably, the reservoir system will comprise a First In First Out system wherein the product output station is remote from the product input station such that the product conveying length extends between the input station and the output station and the conveyor take up length extends between the output station and the input station.

Alternatively, the reservoir system may comprise a reversible first in last out wherein the input station and the output station coincide at the same location, wherein the product conveying length extends between the input station and a defined stop position on the endless conveyor and the conveyor take up length extends between the stop position around the remainder of the conveyor to the product input station.

Preferably, both types of reservoir systems will comprise first and second support members standing upright so as to both lie between a first and second horizontal plane whereby the second and third support members also lie between the same first and second planes so that both the product conveying spiral and the conveyor take up length extend substantially between these two planes.

Figure 2:
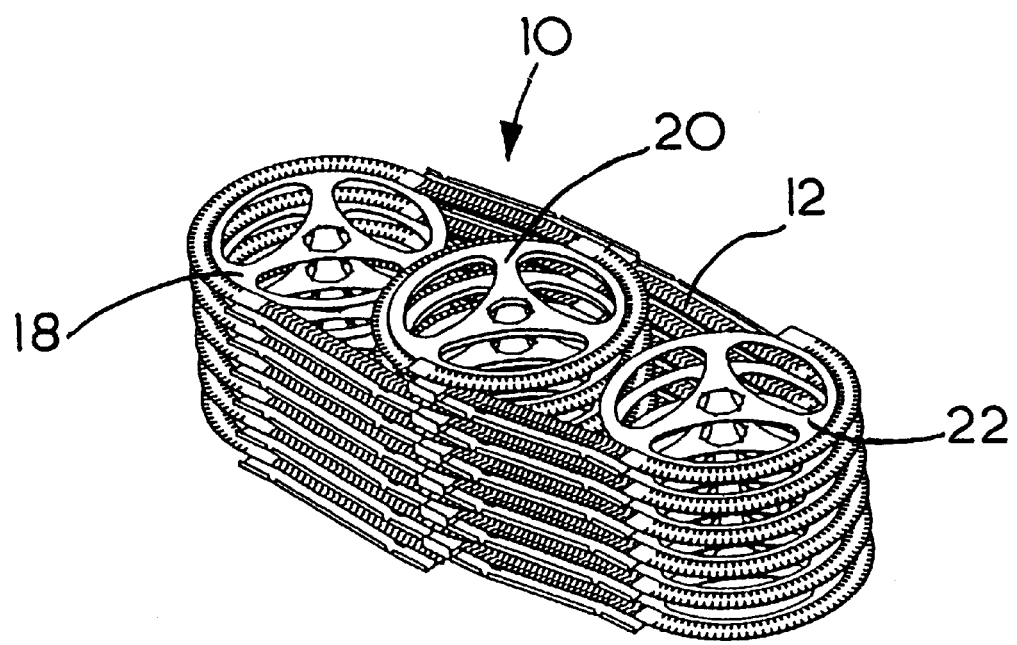
Figure 3:
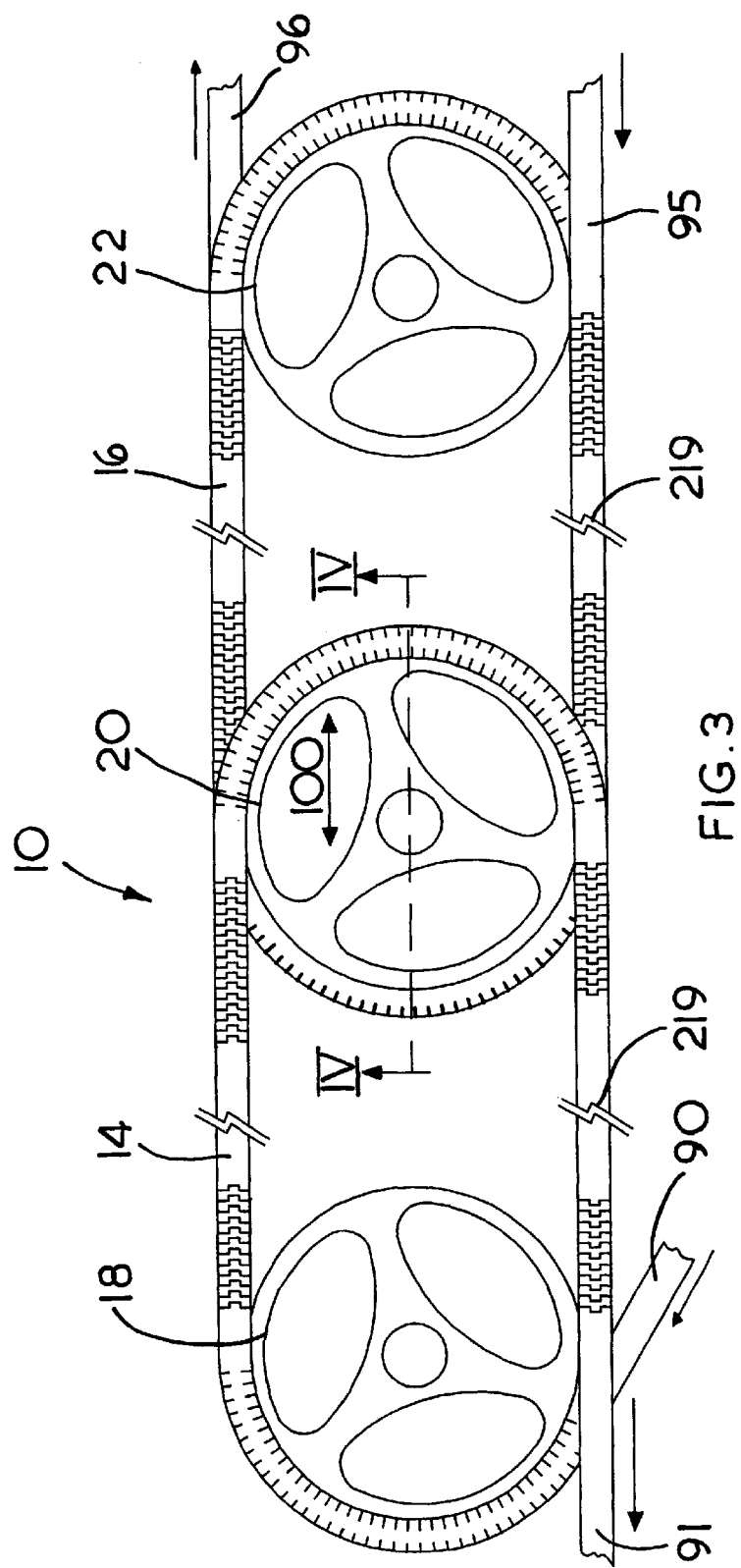
Figure 4:
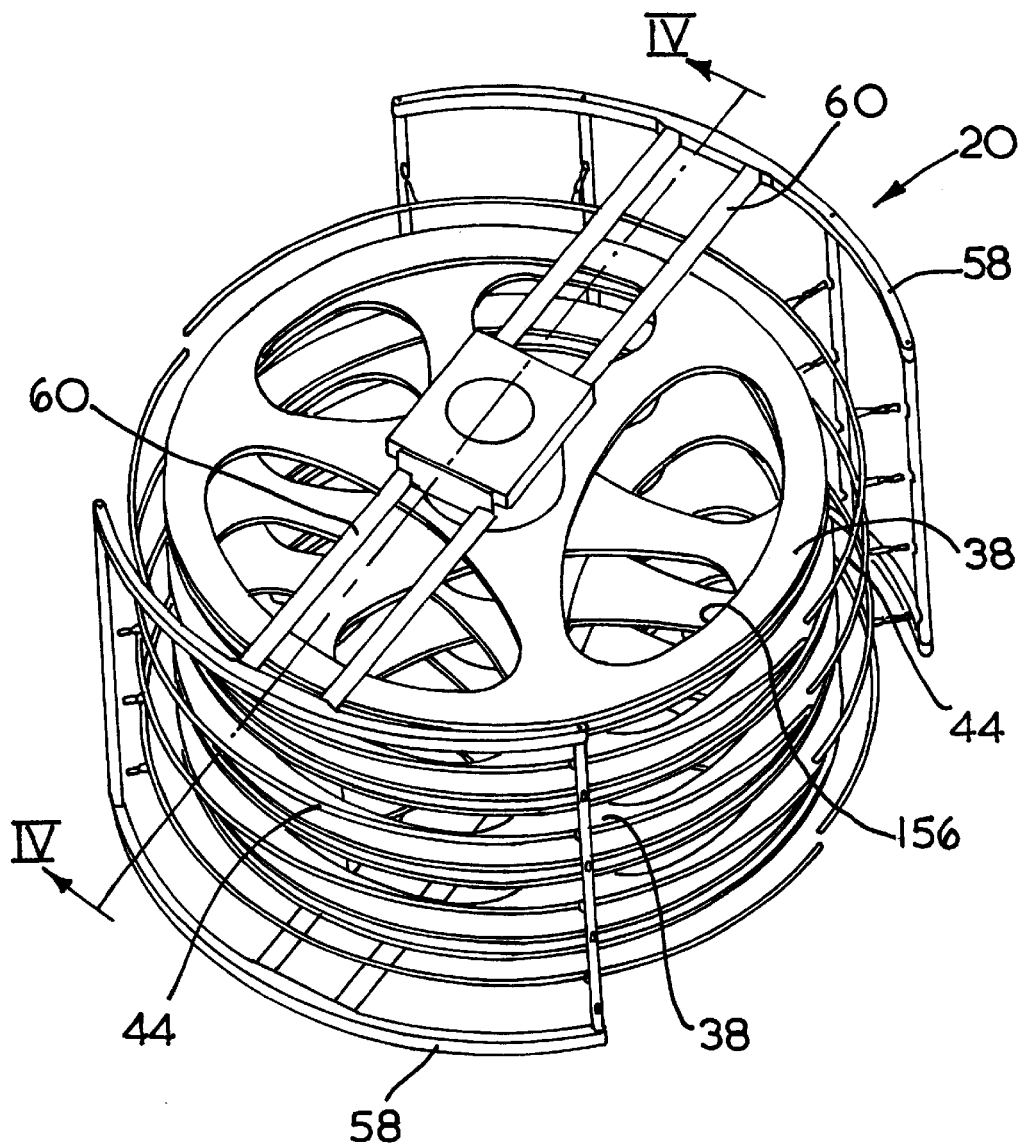
Figure 4A:
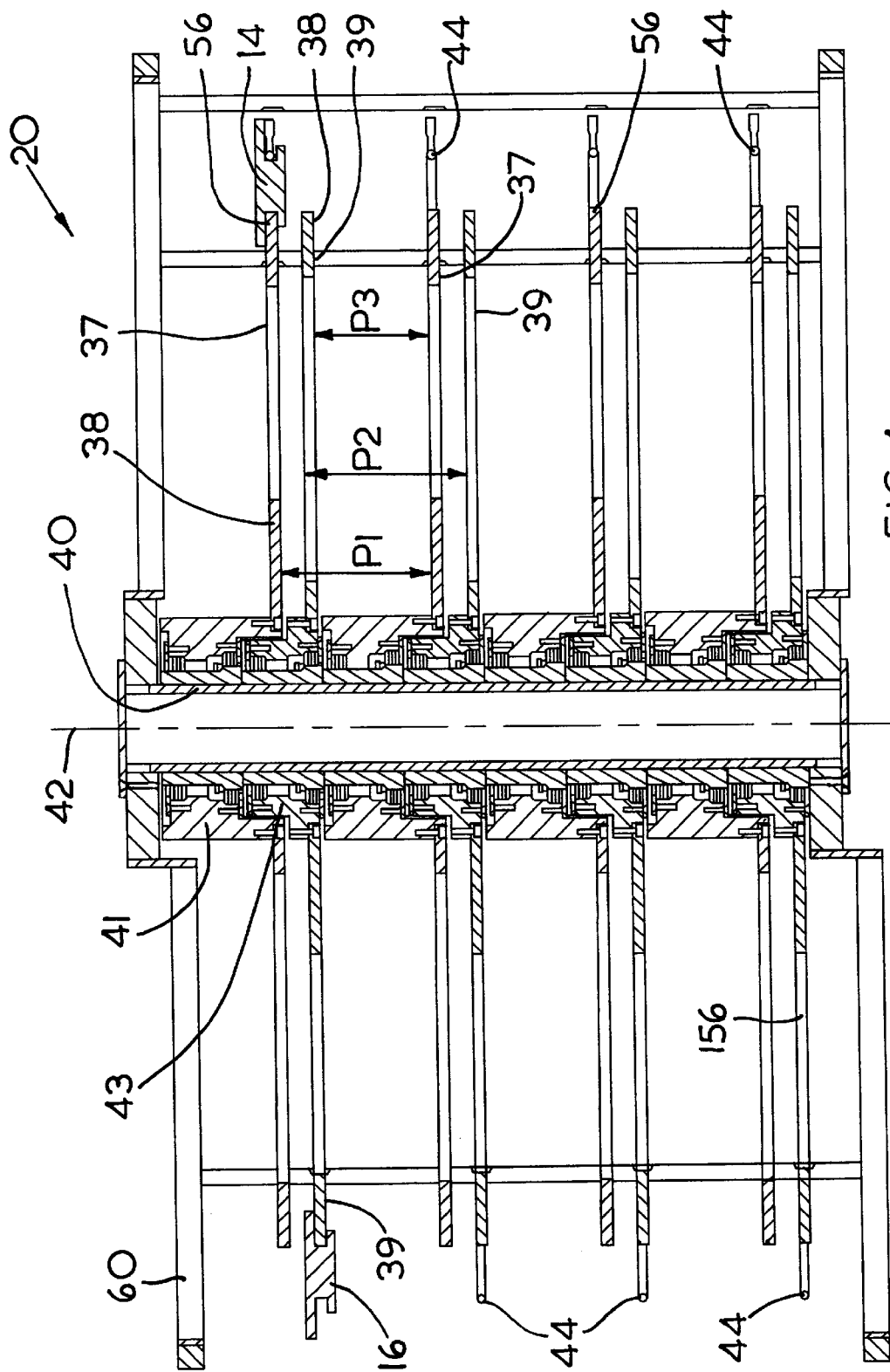
Figure 5:
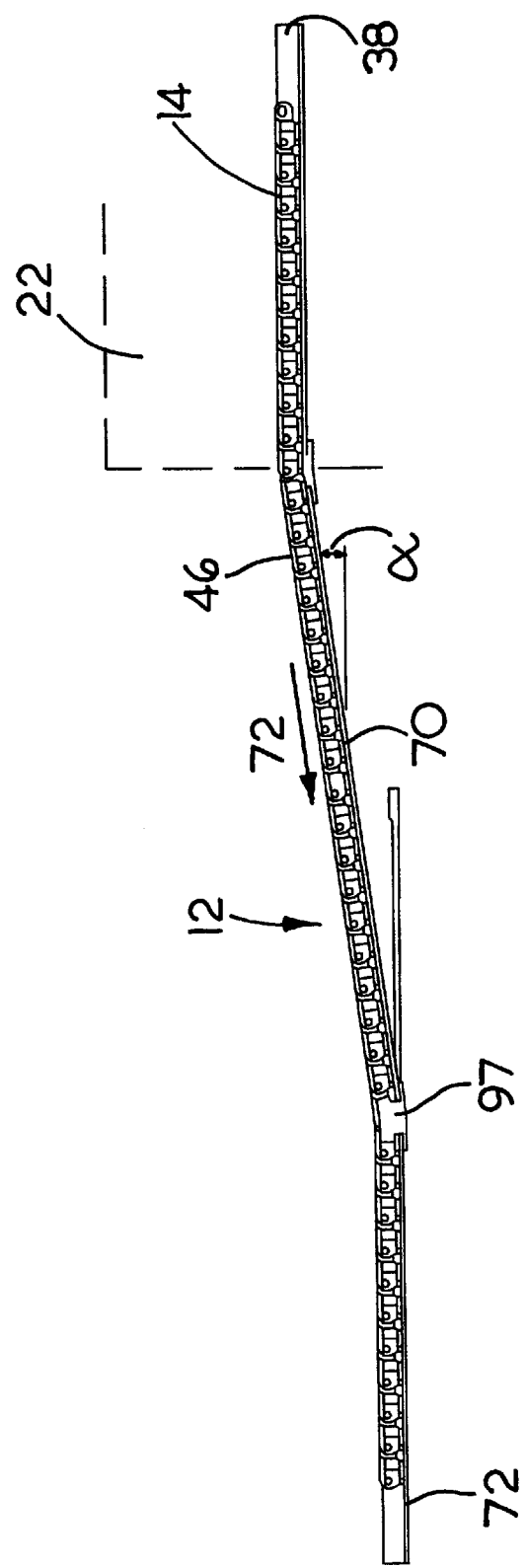
Figure 6:
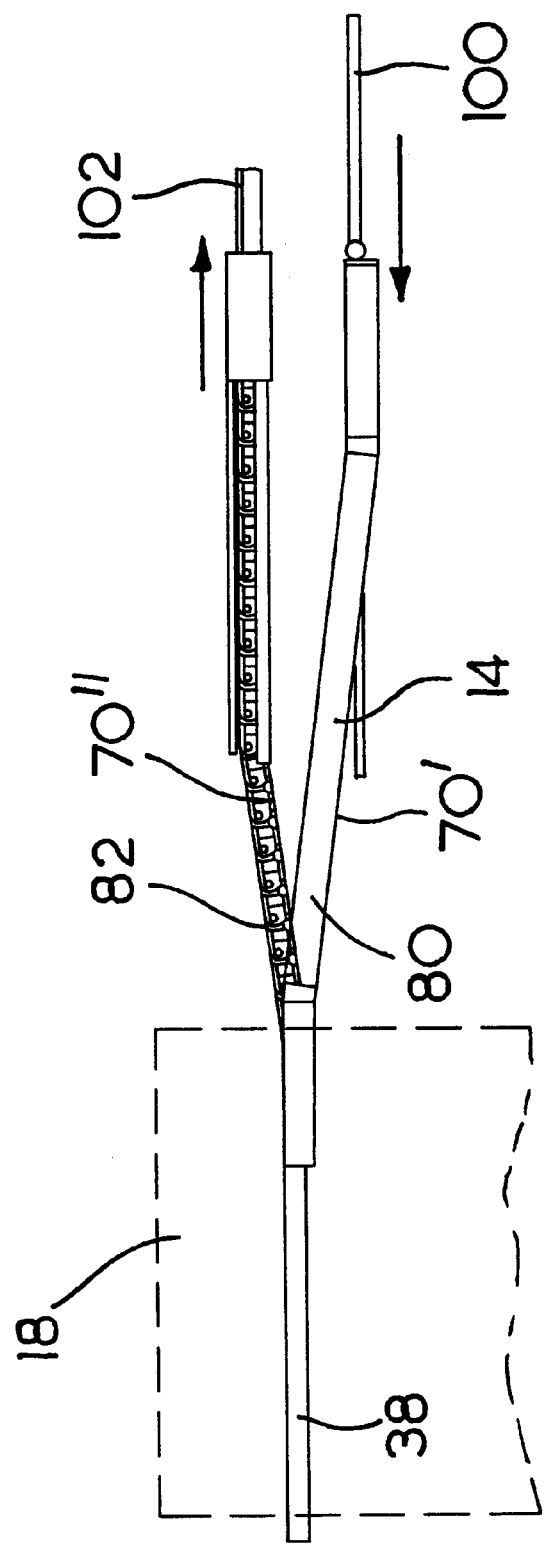
Figure 7:
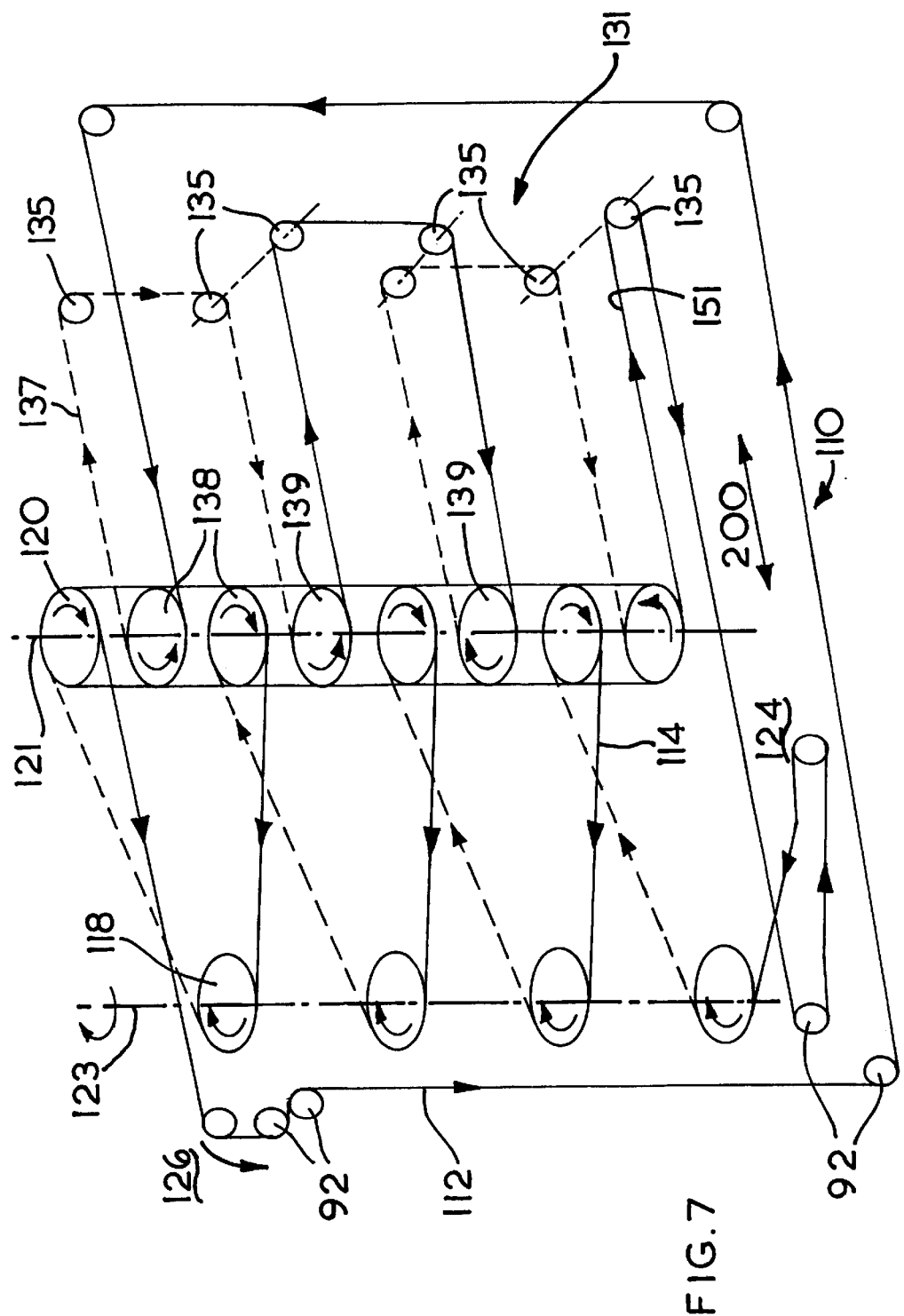

Preferred embodiments of the present invention will now be described, by way of example only, with reference to the accompanying illustrative drawings;

FIG. 1 is a perspective schematic view of a variable capacity reservoir according to the present invention; and FIG. 2 is a perspective view of a variable capacity reservoir belt path of the schematic of FIG. 1; and FIG. 3 is a plan view, from above, of the variable capacity reservoir of FIG. 2; and FIG. 4 is a perspective view of the adjustable drum member of the reservoir of FIG. 2; and FIG. 4a is a cross sectional view of an adjustable drum of FIG. 4 and of the reservoir of FIG. 3 along the lines IV—IV; and FIG. 4b is a plan view of a part length of the conveyor belt of FIG. 2; and FIG. 4c is a cross sectional view of the conveyor belt of FIG. 4b along the lines V—V; and FIG. 5 is a side elevation of a height adjustment guide of the reservoir of FIG. 2; and FIG. 6 is a partial side elevation of the flow path about the reservoir of FIG. 2 showing the height adjustment of the conveyor belt about an end drum; and FIG. 7 is a schematic view of an conveyor path of a reservoir according to an alternative embodiment; and FIG. 7a is plan view from above of the alternative embodiment of a reservoir as shown schematically in FIG. 7; and FIG. 7b is a side elevation of the alternative reservoir of FIG. 7a.

Figure 7C:
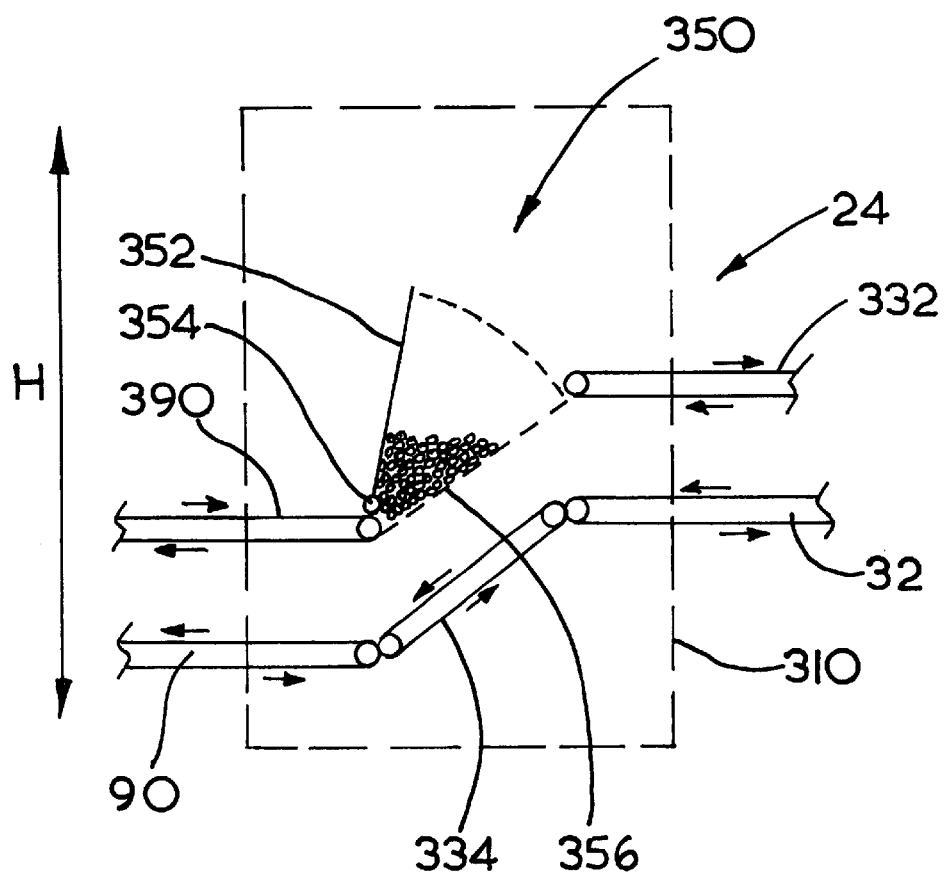

FIG. 7c is a schematic illustration of a headboard design for the reservoir shown in FIG. 1 and FIG. 7.

Figure 8:
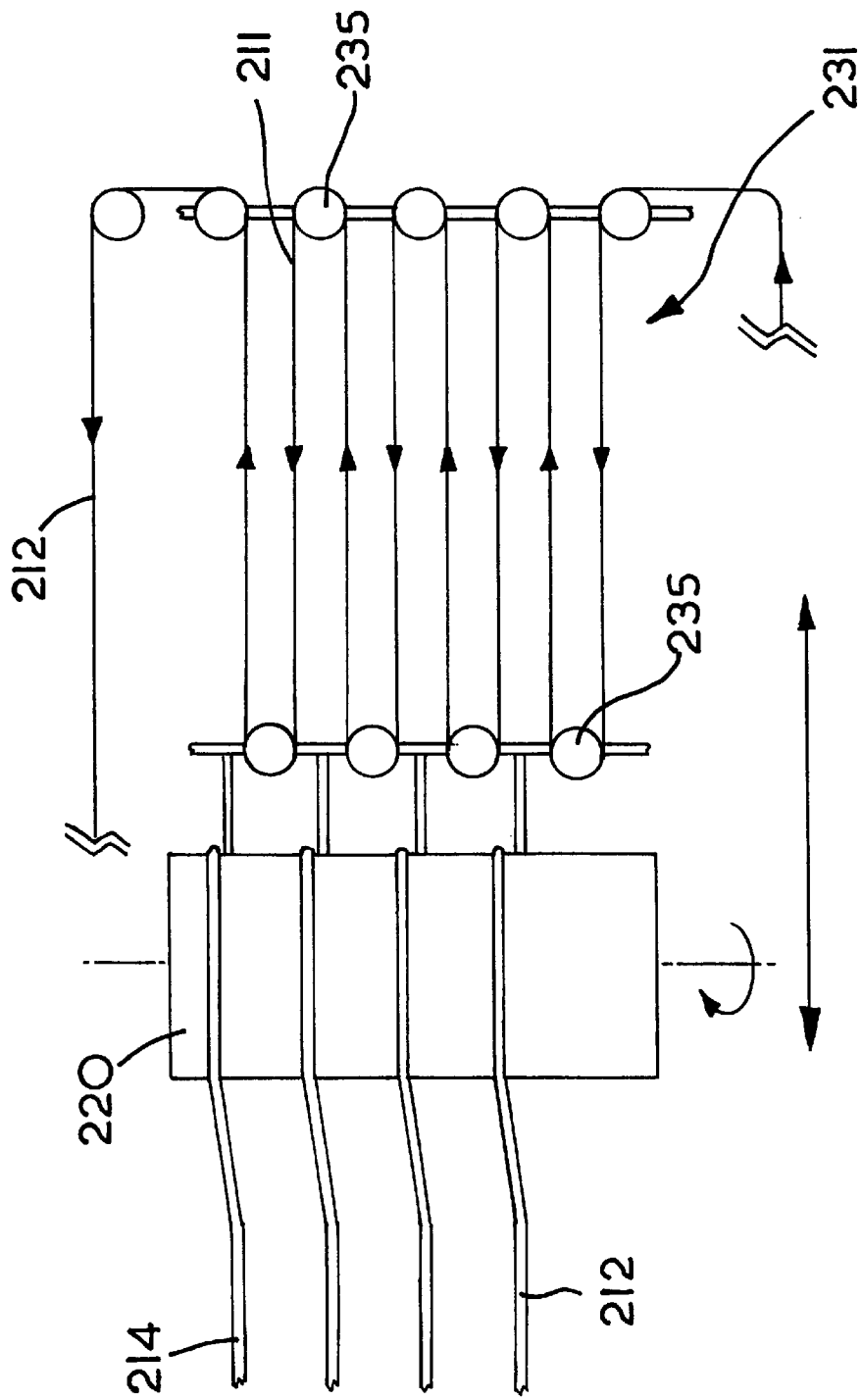
Figure 9A:
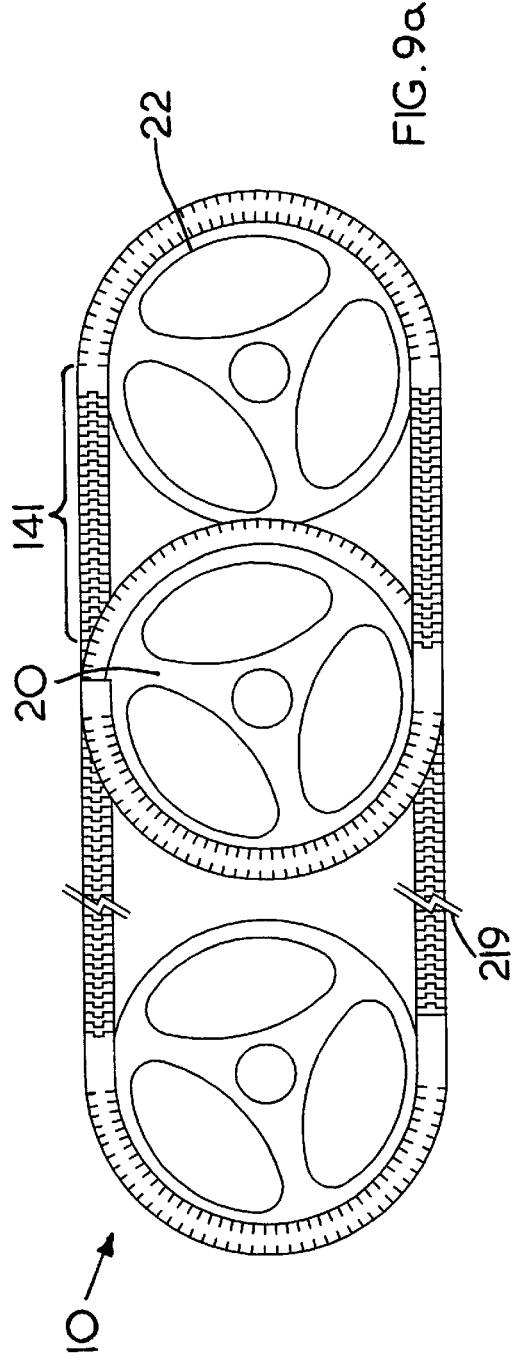
Figure 9B:
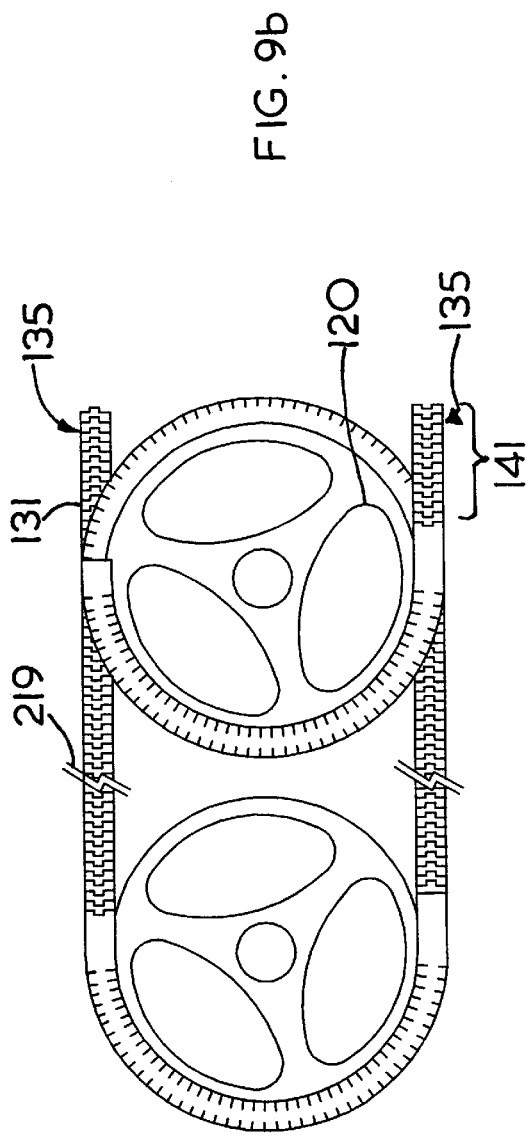
Figure 10A:
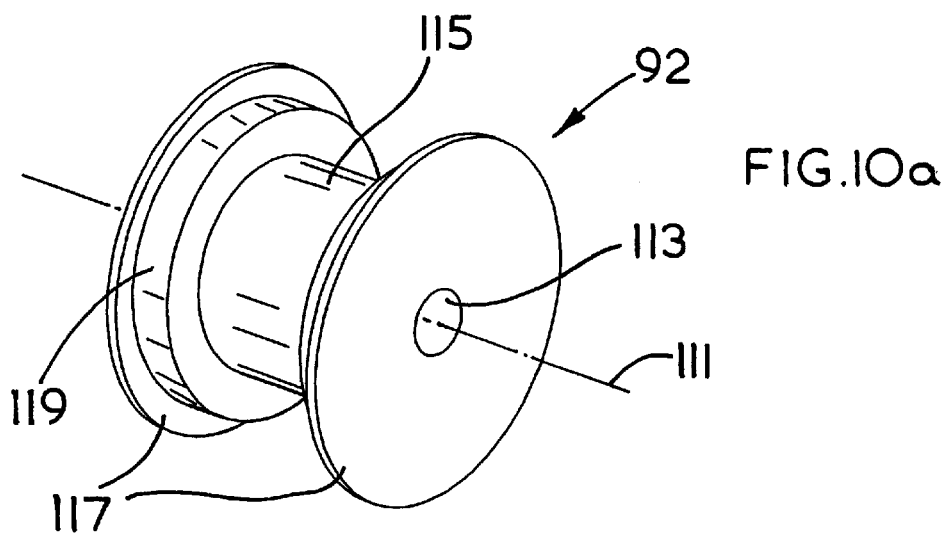
Figure 10B:
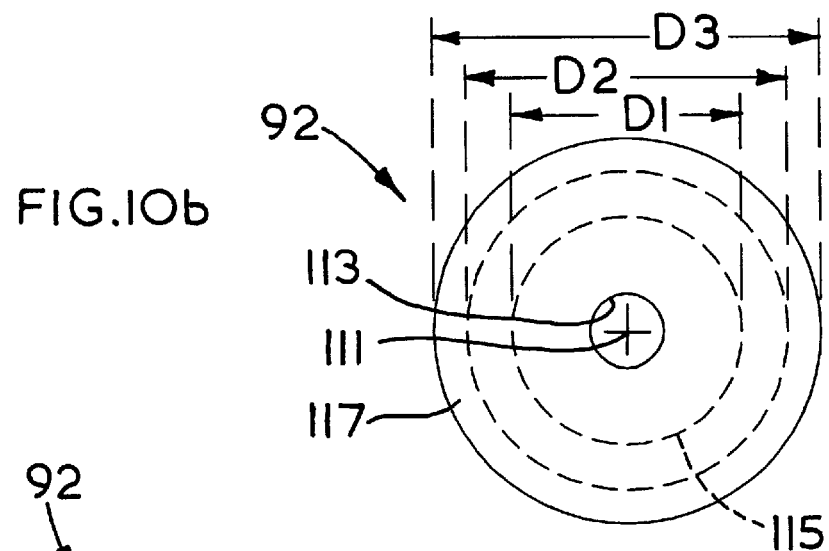
Figure 10C:
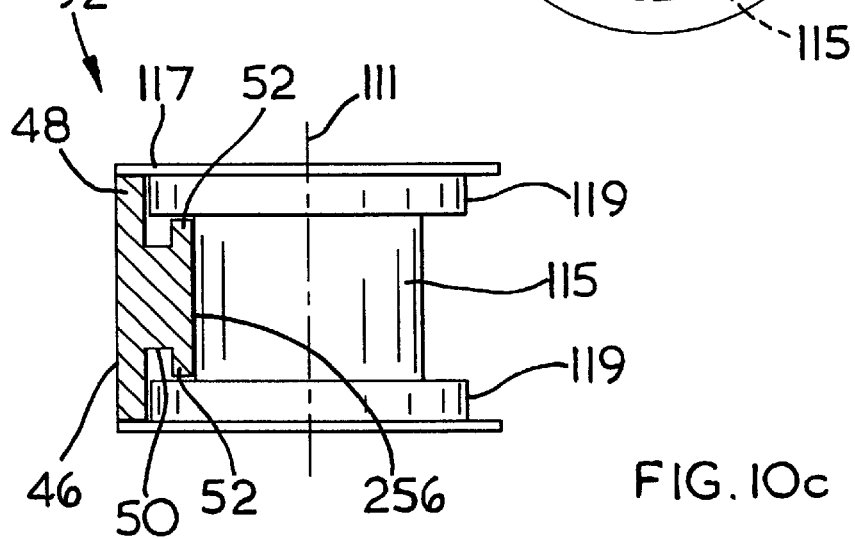

FIG. 8 is a partial schematic side view of further alternative embodiment of a reservoir according to the present invention; and FIG. 9a is a plan view from above of the reservoir of FIG. 2 with the adjustable drum in one end position; and FIG. 9b is a plan view from above of a reservoir having the path configuration of FIG. 7 with the adjustable drum in one end position; and FIG. 10a is a perspective view of an idler wheel for the reservoir FIG. 1; and FIG. 10b is a side view of the idler wheel of FIG. 10a; and FIG. 10c is a plan view of the idler wheel of FIG. 10a, showing in cross section a conveyor belt mounted thereon in a first orientation.

FIG. 1 shows, schematically, a conveyor path for a variable capacity reservoir (10) for elongate articles such as cigarettes or filter rods (9) (shown as example in exploded view in FIG. 1), having a continuous endless conveyor belt (12) extending in two complimentary spiral paths (14) and (16), the first spiral path (14) extending around and between a first, stationery drum member (18) (shown schematically in FIG. 1) and a second adjustable, drum member (20) (the structure of which is omitted for clarity from FIG. 1 but will be described in more detail later). The second spiral path (16) extends between the second drum member (20) and a third drum member (22) (again shown schematically with structure removed in FIG. 1).

This reservoir (10), as is conventional, comprises a product input station shown generally at (24) and a product output station shown generally at (26).

In practice, cylindrical rods such as cigarettes (or filters used in the cigarette manufacturing industry) are fed from a manufacturing machine along a conventional product input flow path (28) which comprises a substantially vertical channel (30), undergoing a substantially 90° turn at the top thereof, for product to be transported by a conventional conveyor belt (32) to the input station (24). Product delivery systems of this type are commonly used with this type of First In First Out reservoir and, since they do not form part of the current invention, will not therefore be described in any great detail herein.

Similarly, the product output station (26) is again conventional for this type of First In First Out (FIFO) variable capacity reservoir and comprises a substantially vertical delivery chute (34) into which the product (cigarettes or filters) are dropped. This output station (26) is provided with guide surfaces (36) to aid the smooth flow of the product into the channel (34). Again, the product output station itself does not form part of the current inventive concept and therefore will not be described in great detail herein. Both the input station and output station shown in FIG. 1 are for illustrative purposes only and there are known to be a large number of varieties of such product input and product output stations within this field of technology any or all of which may be utilised with the current invention.

Referring now to FIG. 2, this perspective view shows the schematic conveyor path configuration of FIG. 1 in a practical application showing the conveyor (12) extending round the first (18), second (20) and third (22) drum members respectively. It is important to note here that the relative distance between the first, second and third drums shown in FIG. 2 is different to the schematic view shown in FIG. 1 but the principle here remains the same and, as will be explained later, the lengths between these drum members may be preset dependent on the particular variable reservoir capacity required by the end user. FIG. 1 is illustrative of an example of a reservoir having an extremely large capacity and also a very large variation in that capacity whereby that shown in FIG. 2 illustrates a smaller volume reservoir having a significantly reduced variation in capacity since the second (20) drum member is only able to undergo significantly limited displacement from left to right as viewed in FIG. 2 between the outer drum members (18) and (22). FIG. 2 is illustrative only, and it will be appreciated that in practice, there will be a minimum distance between the outer drums (18) and (22) to allow for minimal displacement of the adjustable drum member (20) therebetween as will be described later. However, FIG. 2 and the corresponding illustrative conveyor length breaks (21) (shown schematically in FIG. 3) are merely to illustrate that this type of reservoir can be made to different sizes to accommodate different capacities by appropriate spacing between the outer drums (18) and (22). However, the principle of operation remains the same and FIG. 2 is shown (without product input or product output paths) to illustrate the relationship of the belt (20) about the drums (18), (20) and (22).

The three drums, which act as transmission members, are themselves substantially identical and, referring to FIGS. 4 and 4a, will now be described in detail. FIG. 4 shows a perspective view of the central adjustable drum (20) in perspective. The drum is provided with a series of discs (38) which are secured about a central, non rotatable column (40) having a central axis (42). The central drum (20) is designed to carry one end of each of the spiral paths (14) and (16) of the conveyor (12) and thus the discs are arranged in pairs one of each pair to alternatively support a branch of each spiral path. In this particular embodiment, the upper disc (37) of each pair carries the first spiral path (14) whilst the lower associated disc (39) carries the second spiral path (16).

The number of pairs of discs is dependent on the overall capacity required for the reservoir and can be increased by increasing the height of the drum (20). In particular, it can be seen that each disc (37, 39) is mounted on an associated collar (41, 43) respectively (FIG. 4a) which collars are rotatably mounted about the column (40). Each collar (41, 43) defining the spacing between the various discs (38) in the drum structure. By varying the size of the collars (41) and (43) different spacing between the discs can be achieved. In this particular embodiment, the pitch P1 between successive top discs (37) is constant as is the pitch P2 between successive lower discs (39). However, if desired, it is feasible by adjustment of the respective collar heights to provide drums with varying pitches P1 and P2 as desired.

It will be appreciated from FIG. 1 and a basic understanding of a spiral path arrangement with parallel sides extending between two drums, that the conveyor spiral paths (14, 16) passing around the drum (20) will, in fact, only engage with its associated disc (37, 39) over half of the circumference of that disc. In this embodiment, the drum (20) therefore has associated arcuate bar members (44) providing outer guide surfaces to assist support of the conveyor (14) and (16) about the drum.

This is better understood with reference to FIG. 4c showing a conveyor belt in cross section. It is well known for conventional conveyor belts used in this type of system to be made up of a large number of individual link elements (46) held together by overlapping parts having pin members extending therethrough. Referring now to FIG. 4c, a conventional belt element (46) design comprises a substantially T-shaped cross section having a broad upper platform (48) for supporting the products to be carried thereon, and extending downwardly from this platform (48) is a perpendicular trunk member (50) having two outwardly extending flanges (52) disposed either side thereof, parallel with the upper platform (48) but having a substantially reduced width compared thereto. These flanges (52) present two channels (54) on either side of the trunk (50). Conveyor designs of this type are well known in the industry and provide for improved conveyor strength and provides for positive engagement with support members to add rigidity to the conveyor lengths.

In particular, conveyors of this type may be supported in a particular plane or inclination by sitting on a guide or support surface (not shown) so that the lower face (256) engages with such supports. Alternatively, the channels (54) may receive cooperating flanges of a support member (again not shown) to support the conveyor in an alternative manner.

With particular reference to FIG. 4a, the conveyors (14) and (16) are shown (for illustrative purposes) in engagement with their respective associated discs (37) and (39). In this manner, it will be appreciated that as the conveyor extends about the drum (20), one of the discs (38) provides a first flange (56) for engagement with an inner channel (54) of the conveyor (14) whereby the outer channel (54) of the conveyor (14) is supported by the arcuate bar member (44) to provide adequate support as the belt extends in its arcuate path about the drum member (20). Similar engagement is achieved with the disc (39) and associated bar member (44) with the belt conveyor (16). Since the conveyor only engages the drum about half the circumference remote from the main spiral, the bar members (44) need only extend half way about the drum.

In the embodiment shown here, each of the discs (38) are rotatable about the fixed column (40) so as to support rotational displacement of their respective spirals about the drum. However, it is also feasible that the discs themselves may be secured from rotation about the column (40) whereby the conveyor (12) would merely be supported by these discs and associated bar members (44) in a rotational path whereby the belt (14 and 16) will pass over these discs in sliding engagement.

In addition, whilst the drum shown in FIGS. 4 and 4a comprises discs with large cut-out areas (156) it will be appreciated that this is merely to reduce weight and costs of the equipment.

The bar members (44) are supported by extra frames (58) which are restrained from displacement about the column (40) by transversely extending support beams (60) mounted on the column (40).

The drum (20) shown in FIG. 4 and FIG. 4a is, as discussed, is the adjustable central drum for supporting the inner ends of both spirals (14) and (16) (reference FIG. 1). The corresponding outer drums (18) and (22) are similar in design but since each of these outer drums only supports the outer end of one associated spiral conveyor (14) or (16), only one disc of each pair of discs (37) and (39) is required and thus the unused disc may be removed. If the unused disc is to be removed, appropriate spacing elements must be retained on the drum column to maintain or achieve the desired pitch between successive discs. However, the operation of the discs in relation to the conveyor remains the same. For clarity, a similar cross sectional view of drum (22) would have then lower discs (39) omitted whereas a similar cross sectional view of the drum (18) would omit discs (37).

However, these drums (18), (20) and (22) differ in one significant aspect with regard to similar drum units used in the prior art. As is clearly seen in FIGS. 1 and 4a, the arcuate path of each level of a spiral conveyor extending around these drum members is maintained in a plane substantially perpendicular to the axis (42) of the drum member. In this manner, the arcuate path about the drum members followed by the conveyor is maintained in a horizontal plane. The prior art spiral conveyor effectively follows an inclined path extending about the circumference of the drum to achieve a change in level of the spiral.

However, it has been found that inclining an arcuate path for spiral conveyors of this type places additional strain on the products carried by such conveyors which, in the case of delicate rod like articles such as cigarettes or filters, can result in damage to the products themselves. However, if the arcuate paths are maintained on a horizontal plane, these additional stresses are minimised and thus the possibility of additional damage is significantly alleviated.

It is well understood that a spiral arrangement necessitates a change in level between successive branches of the spiral and, whilst such change in level of the prior art occurred by inclining arcuate pathways about the drums, the current invention effects the necessary change of level on the conveyor path extending between the adjacent drum members (18, 20) and (20, 22) respectively.

Referring now to FIG. 5, this shows schematically the drum member (22) having a disc (38) conveying the belt (16) off the drum in the direction of arrow (72) as the disc (38) rotates about this drum (22). Each disc (38) of the drum (22) has an associated inclined guide ramp (70) which engages with the conveyor (12) in a manner similar to that of the disc (38) by having flanges (not shown) for engagement with the channels (54) of each of the link elements (46). This ramp (70) being restrained relative to the drum (22) so that as the horizontal conveyor (14) is driven off the drum (22) it is displaced down this inclined ramp (70) for a predetermined distance until the conveyor (12) then engages and is supported by a substantially horizontal guide surface (72) which simply supports the base (56) of the conveyor (12) which rests thereon. As seen in FIG. 5, the angle α of the ramp (70) with respect to the horizontal is preferably 7°. However, this angle may itself be varied from 1° to 15° if so required. The exact length of the ramp (70) is predetermined for the particular use of this type of reservoir system to effect the desired pitch between successive vertical branches of the spiral. For greater pitch, the angle α could be increased or the length of the ramp (70) increased.

Alternatively, in the preferred embodiment shown herein, and particularly with reference to FIG. 1, it is seen that the central drum (20) does not have any guide surfaces associated therewith but that each of the fixed outer drums (18) and (22) have inclined ramps (70) associated with both the input path of the conveyor leading into the drum and also with the drum conveyor output path. This effects a dual height change of the spiral path between the product input branch (80) and product output branch (82) of each arcuate path about the drum (22). This is illustrated in FIG. 6 showing a partial side elevation of the conveyor belt path (14) about the associated drum (18) as viewed in FIG. 1. Here the product input branch (80) of the conveyor (14) firstly follows a substantially horizontal supported path (100) towards the drum (18) until it engages with a first inclined guide means (70) displacing the belt upwards, when viewed in FIG. 6, into engagement with the disc (38) of the drum.(18), thereby effecting a change in height of the belt between the horizontal spiral path (100) and the horizontal disc path (38). As the conveyor subsequently leaves the drum member (18), it then engages with a second associated guide ramp (70") effecting a second change of height of the conveyor to a second horizontal flow path (102) thereby effecting a two step change in height of the belt path between the belt input and belt output path about the drum (18). Again this is simply one preferred embodiment to effect desired height change and it will be appreciated that there are many variants within the scope of this invention to effect the appropriate change of height on the successive branches of the spiral arrangement by the use of ramp surfaces. For example, instead of the substantially horizontal path of the conveyor (14, 16) between adjacent drum members, the path may follow a series of ramped inclinations using similar ramp members. In addition, or alternatively, whilst the preferred embodiment illustrated in FIG. 1 does not have any ramp guide means (70) associated with the central drum (20), it is clear from the understanding of the present invention that either of the ramp members (70" or 70"") could be displaced so that one or other is associated with the adjustable drum (20). Alternatively, the adjustable drum (20) may additionally include further ramp members (70) associated with its belt input and belt output paths to effect a further change of level in the spiral. Here, such ramp members (70) would need to be secured from displacement relative to the drum (20) whereby such drum (20) is displaceable (as will be described later) between the two fixed drum members (18, 22). With reference to FIG. 5, such ramps would have an end link (97) which engaged with the flat base member (72) so as to be retained from vertical displacement relative thereto but to be slideable therealong so that transition from this sloped conveyor path length to the flat path length occurs at the end link (97) wherever that is disposed along the associated flat path (72). Alternatively still, the end link (97) may in fact be secured from relative longitudinal displacement along this path (72) and the ramp (70) may be omitted completely whereby the inclination is maintained by keeping the conveyor length in tension between the output of the drum (22) and the end link (97) whereby movement of the drum towards or away from this end link (97) results in a change in the angle α. In such an embodiment, appropriate conveyor tensioning would be required maintain conveyor integrity.

One important feature regarding the inclination of the path lengths of the spiral is that for the product conveying length (14), it is important that a regular pitch is maintained between successive vertical branches of the spiral path, since the product conveyed by such reservoir is formed as a carpet of articles usually between 70 and 100 mm deep. Thus the pitch must be greater than the maximum height of the carpet to prevent damage to the product carpet. Thus this pitch between successive branches of the product conveying spiral must also be maintained about the drums (18, 20) and in particular about drum (20) which, due to the provision of two discs (37, 39) the pitch between top disc (37) of one pair of discs and the bottom disc (39) of an adjacent pair of discs (P3) must also be greater than the maximum carpet depth for this type of reservoir (referring to FIG. 4a, the pitch between adjacent discs (36, 39) of each pair of discs (P4) is under no such constraints since the conveyor (16) does not carry any product and simply requires that the conveyor (16) is disposed sufficiently below conveyor (14) to prevent engagement both conveyors overlap as they enter/exit the drum (20).

In its simplest form, in a non adjustable spiral FILO reservoir, the ramp means (70) could be employed to achieve a gradual inclination at a desired angle along the entire conveyor length between adjacent drum members forming the spiral. Such continuous guide means could physically restrain the belt in this complete inclined path or may simply employ guide means at either end to tension the path at two different heights to achieve the same inclination, provided sufficient tension can be maintained in the conveyor belt (12).

Whilst there are many variants to achieve inclination of the belt (12) in its spiral path arrangement remote from the drum members, it is important that the conveyor (14) is maintained in a substantially horizontal plane when it effects the arcuate transition at the opposed ends of the spiral arrangement.

However, whilst the preferred embodiment shown in FIG. 1 provides that both spirals (14, 16) maintain their arcuate path lengths on a horizontal plane, the second spiral path (16) of the conveyor does not in fact carry any product and therefore is not subject to the same constraints requiring its arcuate lengths to be maintained in horizontal plane.

A second major innovative feature of the current apparatus resides in the manner in which the capacity of the reservoir is selectively adjusted. Whilst it will be appreciated that the benefits of maintaining the arcuate path of the conveyor spiral path (14) in a horizontal plane is applicable to any reservoir system, whether it be First In First Out or First in last out and whether that reservoir itself be adjustable, the current embodiment is directed specifically to an adjustable FIFO reservoir with a significant inventive concept being derived from the manner of adjustment of the reservoir capacity.

It is well known in the field of adjustable conveyor design to provide for a spiral conveyor path to provide maximum storage capacity occupying a minimum amount of floor space by providing successive layers of product on the conveyor, one above another, with the only limitations being the physical height of the environment in which the apparatus is used (ie. the ceiling). For non adjustable FIFO equipment, a known capacity reservoir is provided which, by careful control and determination of the flow rate of the conveyor belt, provides a storage facility for the product carried around that path for a predetermined length of time. This may be useful in the situation where, for example, the products are required to flow along a path for a desired time to allow sufficient drying of the product itself before passing to the next stage or to a packaging machine. However, such apparatus does not achieve the objective of varying the capacity of such a reservoir to accommodate increase in volumes of product in the event that the packaging or other output equipment becomes incapacitated. It also fails to address the problems of maintaining a product output flow at a desired rate in the event that product input is impeded (such as by the manufacturing equipment failing). For this reason, FIFO equipment has been designed providing for a variable capacity. The prior art FIFO designs utilise a continuous endless conveyor belt forming a spiral around two associated drums whereby one of the drums is displaceable relative to the other as to increase the length therebetween which concurrently increases the length of each branch of the spiral therebetween offering a significant increase in volume of the reservoir when required since volume capacity is increased by the number of path lengths of the spiral times the displacement, since each path length in increased by that displacement. Thus a relatively small relative displacement can create a significant increase in storage capacity.

To explain this further, with reference to FIG. 3, the present invention comprises two spirals (14,16) whereby the exact path lengths of each spiral in an unactuated position can be preset dependent on the users needs (and thus the path lengths are shown here broken to indicate that this is by way of example only and larger or smaller reservoir capacities are equally feasible (compare FIG. 1 and FIG. 2)).

The reservoir (10) of FIG. 3 (also with reference to FIG. 1) comprises a conveyor input portion (90) leading into the first lower branch of the spiral (14) about the drum (18). The conveyor then forms a first spiral path between drums (18), (20) increasing in height about drums (18, 20) until the conveyor exits this spiral along conveyor output portion (91), and travels towards the output station (26). The continuous endless conveyor (12) is then fed back through a series of chain idler wheels (92), FIG. 1, and a conventional conveyor tensioning means (94) to form an input branch (95) of the second spiral (16) extending between drums (20) and (22) to an output branch (96) of this second spiral, which output branch (96) is then displaced about a further series of chain idler wheels back to the input station (24) to complete the continuous endless conveyor about wheel (93) and is thus fed back into the conveyor input portion (90) of the first spiral (14).

This reservoir receives the product at input station (24) from which it is transferred to the first spiral (14) and then displaced in a spiral path about the two drums (18) and (20) to the output station (26). In this manner the first spiral conveyor (14) carries product, while no product is carried on the second spiral (16).

The chain idler wheels (92) are clearly shown in FIGS. 10a through 10c and comprise a plastic moulded cylindrical wheel design having an axis (111) (although any conventional material may alternatively be used). This wheel (92) comprises an axial extending bore (113) for mounting on an appropriate axle to rotate thereabouts, and basically comprises a maximum external diameter D3 (FIG. 10b) having a thinner tubular core (115) of diameter D1 extending between two parallel and opposed circular end faces (117) having the maximum diameter D3. Both the walls (117) and the core (115) are mounted coaxial of the axis (111). Extending inwardly from each of the side walls (117) are two circular stepped portions (119) extending (117) partway along the axial length of the core (115). The stepped portions (119) have a diameter D2 intermediate diameter D1 and D3 so as to form a substantially stepped cross.

Referring now to FIG. 4c, showing a cross sectional view of conventional conveyor belts used in this type of reservoir system, it is well understood that the conveyor belts used comprise a substantially T-shaped cross section. When such conveyor belts are passed around idler wheels (92) of the type herein described, the broad upper platform (48) of the belt is of appropriate width so as to provide a complimentary fit between the two opposed side walls (117) and to rest on the two opposed circular stepped portions (119) as shown in FIG. 10c. In such a position, the trunk member (50) and outwardly extending flanges (52) are subsequently accommodated within a rebate formed about the narrower core (115) of the wheel (92) between the two opposed stepped portions (119). Preferably, the diameters D1 and D2 of the core (115) and stepped portions (119) are designed so that the upper platform (48) rests upon outer surfaces of the stepped portions (119), whilst the lower face (256) of the conveyor will rest upon the surface of the core (115). Again it is noted that the axial distance between the two stepped portions (119) is of complimentary size to the width of the flanges (52) of the conveyor (46). Alternatively, it will also be appreciated that only one of the surfaces (56) or (48) need engage and be mounted upon a cooperating surface of the wheel (92) to provide sufficient support for the conveyor, whilst conversely the conveyor (46) could be aligned within the appropriate idler wheel (92) by simply providing a complimentary cooperating fit between the platform (48) and the two opposed end walls (117) or between engagement of the flanges (52) with the side walls of projection (119), within the rebate formed between these stepped portions (119). In the current embodiment, engagement is effected on both portions (46, 52) of this T-shaped conveyor belt to provide maximum efficiency in alignment of the belt around such idler wheels.

As will be appreciated from FIG. 1, the conveyor belt (12) will pass about a series of such idler wheels (92) around the entire reservoir system so that the lower portion (56) of the conveyor belt (12) will be either disposed on an inner curve of the belt path about such wheel (as shown in FIG. 10c) or disposed, alternatively, on an outer curved path about such idler wheels ie. the upper surface or platform (48) is in engagement with the idler wheel (92) whilst the trunk member (50) is disposed radially outwards from the idler wheel. This can be appreciated from viewing the conveyor path about the tensioning means (94) in FIG. 1. In this latter case, it will be appreciated from viewing FIG. 10c, that the trunk element (50) will project in an opposite direction to that shown in FIG. 10c whereby only the platform (48) will be received in engagement with the wheel (92) so as to lie between the end plates (117) and sit upon the stepped portions (119). In this situation, the trunk (50) is usually displaced outside of the wheel (92), and alignment and support of the conveyor (12) on this wheel (92), in this mode, is effected purely by the outer side walls (17). It will now be appreciated that this simple design of idler wheel (92) provides for a single wheel design; which can be used throughout the reservoir system of the preferred embodiment irrespective of the direction of curvature of the conveyor belt (12) about such idler wheel, due to the fact that the idler wheel can accommodate both the upper portion (48) of the conveyor belt as well as the lower T-shaped portion (50), (52). It will be appreciated from the above description that the core diameter D1 could alternatively be significantly reduced since it is not essential to engage with the conveyor (46), and additionally, the diameter D2 of the stepped portions (119) can also be varied, the only requirement being that there is sufficient difference between the diameters D1 and D2 to accommodate both the trunk member (50) of the conveyor portion (46) and the outwardly extending flanges (52), and secondly, that the width between the opposed walls (117) is sufficient to achieve a complimentary fit with the width of the conveyor belt itself to provide sufficient alignment. The major benefit of this design of idler wheels is to provide a single component which allows freedom of design in running the conveyor (when not carrying product) about the reservoir.

Whilst drums (18) and (22) comprise rotatable discs (38) (as previously described) to facilitate rotatable displacement of the conveyor about these drums, the two outer drums (18, 22) themselves are restrained from displacement relative to one another, defining a maximum size of the reservoir. However, drum (20) comprises pairs of rotatable discs (38) and furthermore its central column whilst restrained from rotational displacement is laterally displaceable between the two fixed outer drums (18) and (20) (as indicated by arrow 100 in FIG. 3). Displacement of drum (20) from the position shown in FIG. 3 from left to right towards drum (22) effects an increase in the spiral (14) by increasing the length of the conveyor branches between drums (18) and (20). This increase in length of spiral (14) is compensated by complimentary reduction in the length of the spiral (16) effected by reduction in the distance between drums (20) and (22). Such complimentary adjustment is effective due to the first spiral path (14) having the same number of branches as the second spiral path (16).

The innovative concept in this arrangement resides in the fact that two spiral paths are simultaneously adjusted in length in a complimentary fashion by displacement of a single member between them both, about which both spiral paths pass. Such an arrangement provides for a considerable reduction in volume occupied by previous adjustable variable capacity storage reservoirs. In this manner, the two conveyor spirals (14, 16) provide two distinct portions, notably a product transportation spiral (12) and a conveyor return branch (16) (in this particular example a second spiral) whereby the purpose of the conveyor return branch is simply to provide conveyor capacity when necessary to increase the length of product transportation branch and secondly to store excess conveyor length when the product conveying length (spiral) is reduced. By providing a complimentary spiral in the manner discussed above provides a very effective means for achieving this complimentary adjustment of the main spiral (14), whereby alternatively interleaving the branches of the two spirals onto a single drum member (20) provides for a significant height reduction in comparison to prior art systems and thus in the volume occupied by previous conveyors of this type.

Not only does this particular design allow for a more compact variable capacity reservoir, but also provides a reservoir with a reduced height compared to prior art machines. In particular, one of the limitations of reservoirs of this type is a possible maximum height determined by the ceiling height of the plant in which the machine is used. Prior art equipment often necessitated that the conveyor return branch (the take up path length) of this type of reservoir be disposed vertically above the main storage reservoir, effectively reducing the overall operative height of the equipment and limiting the capacity of the reservoir. However, the reservoir according to the present invention can now better utilise the height since the conveyor return length is maintained length wise of the main storage reservoir (14) to allow for a more ergonomic design for placement in a manufacturing environment.

In addition, whilst this preferred embodiment is shown with the three drum members lying in the same vertical plane it will be appreciated that the adjustable drum member (20) need not be displaced directly between these drums to operate in the manner previously discussed, the only requirement being that displacement of the drum member is displaceable in two directions, the first direction increasing the length of the first spiral (14) whilst simultaneously decreasing the length of the second spiral (16) and vice versa.

As is commonly understood in conveyor reservoir systems of this type the conveyor belt itself is driven by a motorised conveyor drive means (not shown) associated with the product input station (24) and product output station (26), which drive mechanisms are conventional and provide for positive motor driven engagement with the belt at these two stations to control the conveyor speed. In this manner, the speed of the conveyor belt (12) at the input station and the output station can be varied independently of each other. In practice, where the reservoir capacity is maintained at constant (ie. no displacement of the drum (20) so as to maintain a constant reservoir volume) then the conveyor speed is maintained constant along its entire length and thus the speed of the conveyor controlled by the input drive and the output drive are consistent.

Referring again to FIG. 3 it will be understood that if disruption to the product output occurs (such as a result of process failure of the packaging equipment to which the product output is directed), then the output speed of the output branch (92) of the first spiral (14) can be reduced or stopped altogether, if necessary, without the need for disrupting or altering the input speed of the input branch (90) of this spiral (14). In this manner, the conveyor input speed is maintained constant, whereby the conveyor (12) fed into the input station (24) is in fact drawn, by the motorised drive means associated therewith, from the corresponding conveyor return branch (16) (drawn from the output branch (96) of the third drum (22)). This effectively causes the adjustable drum member (20) to be displaced or drawn from left to right as viewed in FIG. 1 towards the end drum member (22). Such displacement of the drum member (20) in this direction also effects an increase in the product carrying length (14) of the reservoir system to take up the conveyor belt (12) being driven into the reservoir by the motor at the input station (24). The drum member (20) is automatically adjusted towards the third member (22) by control of the input speed and output speed of the conveyor of this reservoir. Conversely, if the input drive was to be stopped and the output drive maintained at a constant speed then the output drive would serve to draw the conveyor belt (12) from the drum (20) effectively displacing the drum (20) from right to left as viewed in FIG. 1 reducing the size of the reservoir capacity. This is best appreciated with viewing FIG. 3 in its simplistic form whereby if the conveyor output (91) is stopped and the input portion (90) maintained at a constant speed, effectively causing displacement of the output branch (96) from drum (22) at a constant speed, then the displacement of the output branch at (96) causes automatic displacement of the drum member (20) from left to right (since input (95) into this second spiral (16) is stopped). Conversely, if the speed of input (90) is stopped and the speed of outward (91) maintained at a constant pace then the conveyor (12) which is displaced at output (91) must be provided by displacement of the adjustable member (20) from right to left as viewed in FIG. 3 whereby conveyor belt through the output station (91) is returned to the second spiral (16) by input station (95) and is drawn therein by this effective displacement of the drum member (20) from right to left. In this manner, it will be appreciated that adjustment of the drum member (20) to vary the capacity of the reservoir and product return branch of the conveyor is effected automatically by careful control of the input and output speeds of the reservoir system. This carefully controlled displacement of the adjustable drum (20) in a direction towards the drum (22) provides for appropriate automatic accommodation of the conveyor being continuously fed into the first spiral (14) until such time that the reservoir output (91) is again operated. Similarly, should product input be disrupted then conversely the product output branch (91) of the conveyor may be maintained at a constant speed, with appropriate displacement of the drum (20) from right to left as viewed in FIG. 3 so as to supply appropriate conveyor length (carrying product) to the output (92) to maintain product output constant, irrespective of the input speed or whether or not the product input branch (90) of the spiral is stopped completely. This operation will be understood from conventional adjustable spiral reservoirs of this type.

Whilst the first preferred embodiment shown in FIGS. 1 to 3 utilises two complimentary spirals to provide the product transportation branch and the conveyor return branch of this continuous conveyor reservoir, it is well understood in the art that the product return branch of such systems are not essentially required to comprise the complimentary spiral arrangement as shown in FIG. 1. In particular, whilst considerable care is necessary for the design of the product transportation branch of such reservoir to ensure that the product is carefully supported in the correct planes without significant increase in incline or angle to ensure the product does not suffer undue stress, such constraints are not observed for the conveyor return branch of such a continuous belt, since this branch does not carry any product and thus does not need to be held substantially horizontal.

Thus, referring to FIG. 7, an alternative embodiment of the current invention is now shown which achieves the same fundamental operation but in a significantly differently manner. FIG. 7 shows an alternative embodiment of a conveyor path (schematically) which basically comprises a first drum member (118) secured from relative displacement to a second adjustable drum member (120) which, similar to the first embodiment, is displaceable towards and away from the first drum member (118) as indicated by arrow 200. (For illustrative purposes in this particular embodiment, the spiral path of the conveyor between these two drum members (118) and (120) is shown inclined along their entire path length, although in practice these path lengths may be maintained substantially horizontal with the use of associated ramps as described with reference to FIG. 1). However, it will be preferred that the arcuate conveyor path about both drum members be again maintained in a horizontal plane, perpendicular to the vertical axis (121) and (123) of these drums (118) and (120) respectively. Here again the reservoir system will comprise a product input station (124) and a corresponding product output station (126) so that the product entering the reservoir at the input station (124) is passed around a spiral product conveying length (114) (similar to that described for the first embodiment) until it reaches the output station (126). The continuous length conveyor (112) (which may be of similar construction and shape to that previously described) is then passed around a series of idler wheels (92) to a conveyor return branch (131) of the reservoir (110) which again utilises the adjustable drum member (120) as a first transmission means so as to pass about this drum member in a manner similar to that described in the first embodiment but here, instead of forming a second spiral, the conveyor return branch in fact defines a stepped array of parallel paths extending between the drum (120) and second fixed transmission means in the form of a series of fixed idler wheels (135) (here idler wheel (135) will be of same construction as idler wheels (92) previously described). These idler wheels (135) (transmission means) are secured from displacement relative to each other and to the fixed drum (118), usually mounted on a rigid structure.

In this manner the conveyor return branch (131) passes firstly around the drum member (120) about a first disc member (138) in a manner similar to that described for the first embodiment. However, the conveyor length (137) travelling out of drum (120), whilst extending substantially parallel to the input length of the conveyor, engages with a vertical idler wheel (135) to be directed in a vertically downward direction parallel to the second drum axis (121) to a second idler wheel disposed vertically below, so as to direct the conveyor back along a horizontal plane towards the drum (120) where it again passes about the drum in a substantially horizontal arcuate path, about a further rotatable disc (139), which disc is rotatable in a direction opposite to the first disc member about which this conveyor return branch passes (as illustrated by the arrows shown in FIG. 7). Again with reference to FIG. 4a, it will be appreciated that the pitches between adjacent discs carrying the product conveying length of the spiral (114) may have a regular pitch or alternatively may have an irregular pitch P1 whilst it is also possible that the pitch between adjacent rotating disc (139) carrying the conveyor return branch (131) may also be of regular pitch, but more preferably in this particular embodiment this second pitch may be variable between adjacent disc (139). This conveyor then exits drum member (120) towards a second set of vertically displaced and vertically aligned idler wheels (135) to again effect a change in height of the conveyor belt and to return it back towards the drum. This process is repeated to provide a stepped array of horizontal conveyor lengths between the drum (120) and the fixed idler wheels (135) such that displacement of the drum (120) towards or away from the fixed drum (118) effects a relative decrease or increase in the product conveying length of the spiral (114) whilst creating a complimentary increase or decrease in the conveyor length of the conveyor return branch (131) of this reservoir between the drum (120) and the fixed idler wheels (135).

It will be appreciated that whilst the schematic embodiment shown in FIG. 7 utilises pairs of vertically displaced parallel idler wheels (135) to effect vertical displacement of the conveyor downwards in the direction parallel to the second drum axis, it will be appreciated that these two vertically displaced idler wheels of each branch could be replaced by a single larger vertically disposed wheel member to effect arcuate displacement about that wheel in the same plane to displace the conveyor vertically downwards between vertically adjacent branches in this region. The important feature of the alternative transmission means (135) of the conveyor return branch (131) is that transmission between adjacent branches at this region occurs in a plane substantially transverse to the plane in which transmission occurs about the second support member (120). Whilst this is preferably vertical, it will be appreciated that inclination between the wheels (135) will not effect operation of this embodiment and therefore the term "transverse" is, also intended to include non-perpendicular.

With reference to FIG. 7, the final output branch (151) of the conveyor return branch (131) passes a final idler wheel (135) and then is conveyed back around a series of additional idler wheels to the product input station (124) to complete the continuous endless conveyor belt. In this manner, the need of a second rotatable drum is removed providing for a simpler design of a second fixed transmission means (135), especially as the transmission of the conveyor between vertically adjacent branches of this conveyor return branch occurs in a substantially vertical direction about idler wheels acting as path transmission members. However, the principle of adjustment of the various lengths of the product transportation branch (114) and the conveyor return branch (131) remains the same, by utilising a single displaceable member between two outside fixed members and to adjust the respective lengths of the branches. It is important to note here that the discs (138) of the drum (120) are freely rotatable in either direction around an axis of that drum member, so as to allow the various path lengths of the conveyor return branch to effect rotation of the discs in appropriate directions as shown in FIG. 7.

To again provide for a compact reservoir design, the branches of the product conveying spiral (114) and the branches of the stepped array of the conveyor return branch (131) are again interleaved about the central drum (120) to provide for a vertically compact reservoir.

FIG. 7a shows an adjustable FIFO reservoir substantially according to the alternative embodiment of the present invention, the flow path of which is shown schematically in FIG. 7. The reservoir (110) comprises a first drum member (118) secured from longitudinal displacement, together with a second, longitudinally adjustable drum member (120) which operates in a similar manner to the drum members (18) and (20) as discussed with regard to embodiment shown in FIG. 1. As previously discussed, the only difference between the reservoir (110) and the reservoir (10) shown in FIG. 1 relates to the different operation of the conveyor return path (116) and the structure of the alternative support means (135). However, operation of the spiral product storage conveyor (114) of the reservoir (110) is identical to that discussed with reference to reservoir (10) in FIG. 1. As shown in FIG. 7a, the adjustable drum member (120) is shown in the extreme right hand position such that the product conveying length (114) of the reservoir is at a maximum capacity whilst the conveyor return branch (116) is at a minimum capacity. One slight difference between embodiment (110) shown in FIG. 7b and that shown in FIG. 7 is that the vertically displaced pairs of associated idler wheels (135) (used to change the conveyor direction in a vertical path at the third support member) are replaced by a single wheel (170) to achieve exactly the same function of vertical displacement of the conveyor.

One of the major advantages of the reservoir design of FIG. 7 in comparison to that of the design of FIGS. 1 to 3 is graphically illustrated in FIGS. 9a and 9b showing appropriate plan views of the apparatus of FIG. 2 and FIG. 7 respectively. For the first embodiment, the radius of the respective drums (20) and (22) restrict the relative displacement of the drum (20) from left to right as viewed, creating a limitation to the maximum capacity of the reservoir (specifically first spiral (14)) when compared to its overall length. This results in a residual spiral length of the product return branch (41) of reservoir (10), determined by the minimum distance to which the drum (20) can approach drum (22). However, with the embodiment of FIG. 7 (FIG. 9b) displacement of the drum member (120) is not restricted by a third drum (defining the second transmission means) from displacement from left to right and thus the conveyor length (141) of the various branches of the conveyor return branch (131) (when maximum storage capacity is required from the reservoir) is significantly reduced in comparison to the embodiment shown in FIG. 9a thus, for an equivalent sized reservoir, the maximum product capacity is significantly increased and thus the capacity variation is also significantly increased by the path design of FIG. 7. Thus, while the spiral arrangement of the first embodiment provides for simplistic design of this equipment, the stepped path array of FIG. 7 provides for a greater variable capacity or provides for a smaller reservoir machine to effect equivalent product capacity.

However, a further important development of the current invention is the positioning of the headboard (300) relative to the product conveying branch of the reservoir (10) and (110). As mentioned, reservoir (10) and reservoir (110) are substantially identical with regard to placement of the input output stations (24, 124) and operation of the product conveying length (14) in a spiral arrangement between conveyors (18) and (20) and (118) and (120) respectively. Therefore, the same reference numerals will be used to describe the headboard (300) arrangement of both reservoirs which are identical. Firstly, referring to FIG. 1 the headboard (300) basically comprises the product input station (24). Whilst the product input station (24) is shown schematically in FIG. 1 to comprise a meeting of two parallel conveyors to transfer a carpet of rod-like articles (cigarettes) from the first conveyor (32) to an input branch (90) of the reservoir, the actual headboard design is somewhat different and shown illustratively in FIG. 7c, representing a conventional headboard operational design. Referring now to FIG. 7c the product input station (24) comprises a conventional headboard or intermediate buffer (310) which, as well as providing for transfer of the product carpet to a input branch (90) of the reservoir system, also provides for an additional storage of product which is used to maintain carpet depth consistency during any changeover periods between which the input drive of the conveyor (10), (110) is stopped or restarted. Effectively, the input conveyor (32) has associated therewith an overlying parallel conveyor (332) to define a height limit to the carpet as it is transported into the headboard (310). The carpet is then transferred to an intermediate inclined transfer belt (334) (or, alternatively an angled plate could be used) to provide downward displacement of the carpet onto the product input branch (90) of the reservoir (10). The product input branch (90) has an associated upper conveyor belt (390) to help regulate a maximum carpet depth out of the headboard (310) in a conventional manner. Thus, product input on belt (32) is transferred down the inclined belt (334) (or angled plate) to the reservoir input belt (90) to maintain a consistent carpet depth. However, since the input speed of the input branch (90) of the conveyor belt is varied and occasionally stopped in operation of such a variable capacity reservoir (as previously discussed) this repeated variation can effect the carpet flow through the headboard (310) and, as such, the headboard (310) is provided with an additional temporary buffer (350) which effectively comprises a pivotal lid member (352) pivotal about an axis (354) so that in an unactuated position this lid member (352) would lie approximately parallel with the inclined belt (334) (or plate). This lid member (352) is pivotal from right to left to a maximum position shown substantially in FIG. 7c whereby additional product volume (356) (usually comprising several hundred articles) is maintained above the carpet flowpath above the inclined conveyor (334) or plate. Due to the inclined design, the product (356) maintained in this buffer undergoes a smooth through flow to ensure that product is not maintained in this area but continues to flow onto conveyor (90). In the event of interruption to the output speed of conveyor (90), the continuing input of product (356) from conveyor (32) will increase the volume of product (356) in the buffer (350). In the event of interruption of speed of input of conveyor (32) the product (356) maintained in the buffer (350) ensures that the carpet depth is maintained constant and consistent throughout operation of the reservoir. This type of buffer or headboard is conventional in use with reservoir systems used in the cigarette industry but necessitates a headboard height (H) in order to provide a sufficient buffer volume (356). The volume of the buffer (350) defines the height of the headboard.

In conventional reservoir design, the headboard (310) is positioned below the reservoir storage area (in this case product conveying spiral (14)) again adding a further depth restriction on reservoirs of this type whereby the overall depth of the reservoir equipment is defined not only by the product carrying belt depth but also additional features of the reservoir such as the headboard (310). Since it is one of the objectives of the current invention to reduce the depth limitations of this type of reservoir so that the depth of reservoirs (10) and (110) are defined by the operative product conveying belt depth, the current reservoir designs have displaced the headboard to the side of the reservoir (14) which, whilst increasing the overall width of the reservoir, significantly reduces the reservoir height.

Conventionally, where the headboard (310) was displaced below the conveyor system, the conveyor input branch (90) would then need to be inclined upwardly into the first drum member (18), usually at an angle of approximately 7° (as previously discussed 7° being a preferred maximum angle of inclination of carpet flow when passing through various heights). Therefore, depending on the exact height of the headboard (310), sufficient longitudinal distance between the input branch (90) entering the first drum member (18) and exiting the headboard (310) would be required in order to effect appropriate height transfer of the carpet from the headboard to the drum (18) when inclined at an angle of 7°. This would of course limit the exact position of the headboard relative to the reservoir. Additionally, this would limit the depth (H) of the headboard where the reservoir length was itself limited since, if the headboard height (H) was too great then the inclined input belt (90) may not be sufficient to achieve appropriate height transfer over the length of the reservoir.

In operation, it is often found that the positioning of the headboard or input station (24) is limited in relation to the various product manufacturing equipment and packaging equipment within a particular manufacturing plant which itself would then define where the reservoir was to be positioned in the production line. The current design of placing the headboard beside the product carrying conveyor (14) provides for a significant advantage whereby the input branch (90) is maintained substantially on the same plane as the first branch of the product conveying spiral (14) so that the longitudinal placement of the headboard (310) is now defined by the users requirements and not by the necessity of achieving a sufficient input inclination on the branch (90). This provides for a greater freedom of design of not only reservoirs of this type but of also the entire manufacturing production line into which such reservoirs are to be incorporated.

Whilst this novel design configuration in the placement of the headboard beside the reservoir as opposed to conventionally placing it below the reservoir, has been described in relation to an adjustable FIFO reservoir in the current embodiment, it is clearly envisaged that such a design of placing the headboard laterally as shown in FIGS. 7 and 7a is equally applicable to non adjustable reservoirs irrespective of whether such reservoirs are FILO reservoirs or FIFO reservoirs since the same design considerations and benefits apply to the benefit of reducing the operative height of the reservoir design together with the benefit that the headboard may be displaced anywhere along the length of the reservoir and is not constrained by the need to create sufficient ramp (90) inclination at preferred maximum 7° angle. The major benefit of this freedom of longitudinal displacement of the headboard is that the reservoir assembly itself may then be freely positioned in the production line without limitation due to the position of the product feed station (33).

As shown in FIGS. 7a and 7b, a further benefit of placing the headboard adjacent to the reservoir product conveying length (14) is that since the equipment is then provided with a greater overall width, this additional width of equipment can be further utilised to improve the conveyor path between the product conveying length (14) and the conveyor return length (16). This is clearly shown in FIGS. 7a and 7b which have modified conveyor path lengths extending between product output station (126) and the input branch (195) of the conveyor return length. In the schematic embodiment of the flowpath shown in FIG. 7, the conveyor (112) is returned from the product output station (126) to the input branch (195) of the conveyor return path via a series of idler wheels (similar to those shown in FIGS. 10a to 10c) by passing it below the reservoir itself. Since one of the objectives is to minimise the overall height of such reservoirs, FIGS. 7a and 7b show a modified conveyor return path length (390) extending from the conveyor output (126) to the conveyor return path (195). In this embodiment, the output length of the conveyor (397) from the product output station (126) is firstly displaced laterally away from the reservoir (110) along a lateral displacement path (399) so as to extend in a substantially parallel path adjacent to the longitudinal lengths of the product conveying spiral (14), such path lying above the headboard (310) so as not to project above the maximum height of the reservoir spiral (114). It will also be seen in FIG. 7b that this return path (390) undergoes a height change at (401) before undergoing a second lateral path change at (403) to return to a substantially vertical plane in which the height adjustment idler wheels (135) are employed to effect the appropriate vertical displacement and change of direction of the conveyor. It will be appreciated from FIG. 7b that the use of idler wheels (135) shown in FIG. 7 are in fact in this embodiment replaced by arcuate wheels (170) to effect the same vertical displacement and change of direction of the conveyor return path.

The conveyor output (151) of the conveyor return length is then returned via an appropriate array of idler wheels directly below the reservoir back to the input station (124) in the manner described with reference to FIG. 7. In this manner, the overall height of the reservoir is again maintained as a minimum by utilising the additional lateral size of the reservoir equipment to accommodate a conveyor return flowpath (390).

Finally, FIG. 8 shows a further embodiment of the current invention whereby here the product return branch (231) of the continuous conveyor (212) extends between two parallel arrays of offset idler wheels (235). In this manner, the reservoir comprises two drums (only one of which is shown) similar to that of the previous two embodiments with a conventional spiral reservoir (214) being formed between an adjustable drum member (220) and a fixed drum member (not shown) as described for FIG. 7. A continuous conveyor (212) comprises a product input station and a product output station (not shown) similar to that described in reference to FIG. 7. However, in this embodiment, the conveyor return branch (231) does not pass about the adjustable drum member (220) in a horizontal arcuate path but instead the drum (220) has securely attached thereto a vertical array of vertical idler wheels (237) extending parallel to a complimentary array of idler wheels (235) which fixed relative to this displaceable drum (220) with the path length of the product conveyor return branch (231) extending in a serpentine manner between the two sets of idler wheels before finally returning to the product input station along branch (212). In this manner, as the drum (220) is displaced towards or away from the first drum member to vary the length of the product transportation spiral, the fixed array of idler wheels (237) mounted on the drum are moved away from or towards the secured idler wheels (235) to effect a complimentary adjustment in the length of the conveyor return branch. In both the embodiments of FIG. 7 and FIG. 8 is it essential that appropriate design is undertaken such that sufficient path length is provided on the conveyor return branch (231) to compliment the variation in the spiral length of the product conveying branch. If necessary, a series of vertical serpentine paths similar to that shown in FIG. 8 could be employed rather than the one vertical array as shown in FIG. 8. In such a case, one of the idler wheels (235 or 237) will be mounted horizontally to effect a horizontal displacement between adjacent serpentine arrays. Again it is significant to note that the conveyor return branch (231) comprises an array of adjustable path lengths disposed so as to be substantially interleaved between the spiral branches of the product conveying length (214) to ensure that the conveyor return branch (231) is maintained substantially between two horizontal planes defined by the upper and lower extent of the product conveying spiral (214) to ensure a reservoir having a carefully controlled height, whereby all available height is employable by the spiral of the product conveying branch of the conveyor.

As previously discussed briefly in reference to FIG. 1, the conveyor (12) is provided with a tensioning means (94) or more particularly a conveyor slack elimination device (94) to maintain appropriate tension in the conveyor. Conventionally, the plastic link conveyors used in this type of reservoir are subject to stretching when first used, as the individual links (46) of the conveyor are stretched to their normal operative position. This settling of the conveyor may take several weeks and result in an increase in the conveyor length of several hundred centimetres over a conveyor length in the order of several hundred metres. It is therefore necessary to provide a means to compensate for any stretching of the belt and this is usually achieved by simple slack elimination devices as shown in FIG. 1 whereby the conveyor itself is passed in a serpentine path over a series of vertical idler wheels, the lower of which idler wheels are displaceable relative to the fixed upper idler wheels and have a force applied thereto (illustratively shown here as a weight (98)) whereby this force effects downwards displacement of the displaceable idler wheels to increase the conveyor path length through this serpentine array of idler wheels and thereby compensating for any increase in length caused by stretching of the conveyor, eliminating any slack within the conveyor itself. If such slack elimination devices themselves are insufficient to compensate for all the increase in length of the conveyor in operation, the system can be temporarily shutdown whereby a number of the individual conveyor elements (46) can then be removed from the conveyor belt and the slack elimination device reset to compensate for further increases in length.

The current invention now provides for a further improvement to reservoir systems of this type by providing an integrated slack elimination device in combination with one or more of the conveyor support members or individual support means. In particular, referring now to the schematic illustration of the path length shown in FIG. 7, at least one of the idler wheels (135) may be displaceable away from the second drum member (120) by an appropriate biasing force. The biasing force could involve a spring tensioned member or the application of a conventional weight applied about a fulcrum to apply a tensioning force from left to right as viewed in FIG. 7. In this manner, should any increase in length in the conveyor belt (112) occur, the biasing force applied to the appropriate member (135) would effect displacement of the appropriate idler wheel (135) from left to right as viewed in FIG. 7 providing an additional length of that particular branch supported by that idler wheel to compensate for the increase in length of the conveyor (112).

As previously discussed, the idler wheels (135) are preferably secured from displacement relative to each other in one embodiment of the current invention and therefore, in such an embodiment, the supporting means for all these idler wheels could alternatively be biased so as to be displaceable in a direction from left to right as viewed in FIG. 7 to provide for such a slack elimination device, again with appropriate biasing force being applied simultaneously to all the idler wheels (135) shown in FIG. 7. The overall operation of the adjustable reservoir as previously described remains unaffected by the integration of the slack elimination device with the support means (131) (either in combination or individually), since displacement only occurs when additional slack is observed in the conveyor and once this slack has been eliminated, further displacement of the slack elimination device is prevented by the system returning to equilibrium. In this manner, at least one of the end conveyor support members (118, 122) may be displaceable away from the second support member or drum (120), but restrained from displacement towards such drum member (120) by the appropriate biasing force.

Such an advantageous design of incorporating the slack elimination device with the product support member (131) is equally applicable to the embodiment of FIG. 1 whereby here the entire drum member (22) may be biased from left to right as viewed in that Figure by the application of an appropriate biasing force to again accommodate any slack within the conveyor (12). Yet further, instead of the entire drum member (22) being biased so as to be displaceable from left to right as viewed in FIG. 1, it is possible that one or more of the individual disc members may be displaceable and biased from left to right to achieve such slack elimination.

Whilst the integrated slack elimination device has been described as feasible for integration into the conveyor return path length, it is similarly envisaged that the product conveying length of such a reservoir could also utilise an integrated slack elimination device whereby here, for example, the drum members (18) or (118) of FIG. 1 and FIG. 7 respectively could also be biased from right to left as viewed in their respective figures by the application of an appropriate biasing force.

The essential feature of the integration of the slack elimination device into the conveyor support means in this manner is to provide a means for increasing the overall conveyor length to accommodate for any elongation of the conveyor during the initial operation whilst restraining the outer support members (18) and (22) from displacement towards the central support member (20). In this manner, it is also envisaged that a ratchet arrangement could be utilised whereby when one of the outer support members (18) or (20) is displaced away from the central support member (20) in this manner, the ratchet mechanism could be employed to prevent the displaced outer support member (18) or (22) from being displaced back towards its original position ie. back towards the central support member (20). It is already well known within the art to utilise such ratchet members on conventional slack elimination devices to maintain them in their compensatory position once achieved and to prevent them returning to their original unbiased positions whereby slack would be reintroduced to the conveyor.

Again whilst the novel feature of incorporating the slack elimination device so as to be integral with the conveyor support members or individual support means of such members is described for the preferred embodiments of the current invention, such a novel feature is equally applicable to other types of reservoirs described herein, since such slack elimination devices are commonplace in all reservoirs of this type and particularly those utilising a spiral product conveying length where one of the support members of the spiral could be biased away from the other support member with the appropriate biasing force so as to provide an integrated slack elimination device.

It will be appreciated that the major advantage of integrating the slack elimination device (or chain tension device) with one of the conveyor support members of this type of reservoir is the overall reduction in size of the reservoir itself. In the embodiment shown in FIG. 1 the slack elimination device adds approximately 10% to the overall length of this reservoir design which is eliminated by integration of such device with one or other of the drums (18) or (22). In addition, such slack elimination devices are conventionally displaced either above or below the conveyor of such reservoirs and thus, to reduce the overall height of such reservoir equipment, then such integration serves to support the objectives of the current invention.

The above description of the various embodiments are by way of example only and it will be appreciated that the drive means employed for effecting continuous displacement of the conveyor belt have not been described in any detail but are considered to be well known in the art, comprising various designs of motorised wheels, often engaging the conveyor belt at or about both the product input stations and product output stations respectively so as to control the conveyor speed at appropriate positions on the continuous conveyor. However, since the operation of the drive means of such conveyor belts on variable capacity reservoirs is well understood they will not be described in detail herein.

It will also be understood that whilst the preferred embodiments are directed to FIFO equipment, they are equably applicable to First in last out variable capacity reservoirs comprising a spiral conveyor path extending around two drum members whereby the maximum capacity of such a FILO reservoir could be adjustable by utilising the embodiments herein described. In such a situation, it is simply necessary for the belt to be made reversible about its path length and for the product input station to also comprise a product output station in a manner conventional for FILO equipment.

In addition, whilst the preferred embodiments utilise drum members of the type described above to define the various spiral pathways, it will be appreciated that such drum members are not essential and could be replaced by an array of alternative transmission means to convey the conveyor in a substantially arcuate path. Such means could comprise an array of rollers or idler wheels defining a gradual displacement of the conveyor in a substantially arcuate path. Similarly, whilst the drum members described in these preferred embodiments are disposed on a vertical axis it will also be appreciated that this is not essential but could comprise an inclined axis, provided that the conveyors are maintained on a horizontal plane about any such inclined axis and that any offset spiral created by non vertical drum axis are provided with complimentary spirals on the other of the product conveying or the conveyor return branches of the continuous conveyor.

What is claimed is:

1. A variable capacity reservoir system for rod like articles, comprising a product input station and a product output station, having a continuous endless conveyor with an adjustable product conveying length and a complementary adjustable conveyor take up length;
   conveyor adjustment means for effecting an increase or decrease in the product conveying length and complimentary decrease or increase respectively in the conveyor take up length, wherein the conveyor adjustment means comprises spaced first and second support members arranged respectively on substantially parallel first and second axes and between which, and supported by which, is one of said product conveying length or conveyor take up length so as to define a spiral path extending around said first and second support means;
   the other of said product conveying length or conveyor take up length being supported between said second support member and a third support member, said first and third support members being restrained from relative displacement towards said second support member said second support member being displaceable relative to said first and third support means to simultaneously effect said complimentary adjustment of the conveyor length extending between said first and second support means and said second and third support means respectively.

2. A reservoir system as claimed in claim 1 wherein at least one of said first and third support members are secured from displacement relative to said second support member.

3. A reservoir system as claimed in claim 1 wherein at least one of said first and third support members is restrained from displacement towards said second support member by the application of a biasing force thereto in a direction away from said second support member so as to bias said at least one of said first and second support members away from said second support member.

4. A reservoir system as claimed in claim 3 wherein said at least one of said first and third support members forms a conveyor slack elimination device.

5. A reservoir system as claimed in claim 1 wherein said second support member is disposed directly between said first and third support members.

6. A reservoir system as claimed in claim 1 wherein at least said first and second support members comprise support means for effecting support and transmission of a spiral conveyor around said first and second support means.

7. A reservoir system as claimed in claim 6 wherein said support means define an arcuate path.

8. A reservoir system as claimed in claim 7 wherein at least one of said support members comprises a cylindrical drum and each arcuate path is disposed in a plane perpendicular to an axis of said drum.

9. A reservoir system as claimed in claim 8 further comprising guide means associated with at least one of an input and an output of said arcuate path to effect inclined displacement of said endless conveyor from a first horizontal plane to a second horizontal plane.

10. A reservoir system as claimed in claim 1 wherein both the product conveying length and conveyor take up length extend around the second support member so as to be interleaved.

11. A reservoir system as claimed in claim 1 wherein the first and second support members are upright and lie between a first and second horizontal plane and said second and third support members lie between the same first and second planes.

12. A reservoir system as claimed in claim 1 wherein said third support is arranged on a third axis that extends parallel to the second axis, and the other of said product conveying length or conveyor take up length further defines a complimentary spiral path around said second and third support members.

13. A reservoir system as claimed in claim 1 wherein the pitch of the or each spiral is constant.

14. A reservoir as claimed in claim 11 wherein said other of said product conveying length or conveyor take up length defines at least one pair of first and second adjacent path lengths extending between said second and third support members in opposite directions in a first plane parallel to said axis of said second support member, wherein said third support member comprises transmission means for transmitting said conveyor between said adjacent first and second path lengths in this first plane.

15. A reservoir system as claimed in claim 14 wherein said other of said product conveying length or conveyor take up length defines at least one third path length extending between said second and third support member adjacent to and in an opposite direction to one of said first and second path lengths, wherein said third path length and said one of said first and second path lengths lie in a second plane perpendicular to said axis of said second support member, wherein said second support member comprises transmission means for transmitting said conveyor between said third and said one of said first and second path lengths in said second plane.

16. A reservoir as claimed in claim 14 wherein said third support member transmission means is restrained from displacement towards said second support member by the application of a biasing force thereto in a direction away from said second support member so as to bias third support member transmission means away from said second support member.

17. A reservoir system as claimed in claim 1 wherein said other of said product conveying length or conveyor take up length defines at least one serpentine path between said second and third support members.

18. A reservoir system as claimed in claim 1 comprising a first in first out system wherein said product output station is remote from said product input station and said product conveying length extends between said input station and said output station and said conveyor take up length extends between said output station and said input station.

19. A reservoir system as claimed in claim 1 comprising a reversible first in last out system wherein said input station and output station coincide at the same location of said conveyor path wherein said product conveying length extends between said input station and a defined stop position on said endless conveyor and said conveyor take up length extends between said stop position around the remainder of said belt to said product input station.

20. A reservoir as claimed in claim 11 in which said input station comprises a headboard defining a height of said input station and wherein said input station is disposed between said first and second horizontal planes.

21. A variable capacity reservoir system for rod like articles, comprising a product input station and a product output station, having a continuous endless conveyor with an adjustable product conveying length and a complementary adjustable conveyor take up length;

conveyor adjustment means for effecting an increase or decrease in the product conveying length and complimentary decrease or increase respectively in the conveyor take up length, wherein the conveyor adjustment means comprises first and second support members arranged respectively on spaced substantially parallel first and second axes and between which, and supported by which, is one of said product conveying length or conveyor take up length so as to define a spiral path extending around said first and second support means;

the other of said product conveying length or conveyor take up length being supported between said second support member and a third support member that is arranged on a spaced third axis that is substantially parallel to the second axis so that the other one of said product conveying length or conveyor take up length defines a second spiral path extending around the second and third support members;

said first and third support members being restrained from relative displacement towards said second support member said second support member being displaceable relative to said first and third support means to simultaneously effect said complimentary adjustment of the conveyor length extending between said first and second support means and said second and third support means respectively.

22. A reservoir system as claimed in claim 21 wherein both the product conveying length and conveyor take up length extend around the second support member so as to be interleaved.

* * * * *